July 24, 1951 W. T. POWELL 2,562,123

AUTOMATIC TELEPHONE SYSTEM

Filed Aug. 22, 1947 16 Sheets-Sheet 1

INVENTOR.
WINFRED T. POWELL
BY T. L. Bowes
ATTORNEY

July 24, 1951 W. T. POWELL 2,562,123

AUTOMATIC TELEPHONE SYSTEM

Filed Aug. 22, 1947 16 Sheets-Sheet 2

INVENTOR.
WINFRED T. POWELL
BY J. L. Bowes
ATTORNEY

July 24, 1951 W. T. POWELL 2,562,123

AUTOMATIC TELEPHONE SYSTEM

Filed Aug. 22, 1947 16 Sheets-Sheet 3

INVENTOR.
WINFRED T. POWELL
BY J. L. Bowes
ATTORNEY

July 24, 1951 W. T. POWELL 2,562,123

AUTOMATIC TELEPHONE SYSTEM

Filed Aug. 22, 1947 16 Sheets-Sheet 4

INVENTOR
WINFRED T. POWELL
BY T. L. Bowes
ATTORNEY

July 24, 1951 W. T. POWELL 2,562,123

AUTOMATIC TELEPHONE SYSTEM

Filed Aug. 22, 1947 16 Sheets-Sheet 5

INVENTOR.
WINFRED T. POWELL

BY T. L. Bowes

ATTORNEY

July 24, 1951 W. T. POWELL 2,562,123

AUTOMATIC TELEPHONE SYSTEM

Filed Aug. 22, 1947 16 Sheets-Sheet 6

INVENTOR.
WINFRED T. POWELL

BY T. L. Bowes

ATTORNEY

July 24, 1951 W. T. POWELL 2,562,123

AUTOMATIC TELEPHONE SYSTEM

Filed Aug. 22, 1947 16 Sheets-Sheet 7

INVENTOR.
WINFRED T. POWELL

BY T. L. Bowes

ATTORNEY

July 24, 1951 W. T. POWELL 2,562,123

AUTOMATIC TELEPHONE SYSTEM

Filed Aug. 22, 1947 16 Sheets-Sheet 8

INVENTOR.
WINFRED T. POWELL
BY T. L. Bowes
ATTORNEY

July 24, 1951 W. T. POWELL 2,562,123

AUTOMATIC TELEPHONE SYSTEM

Filed Aug. 22, 1947 16 Sheets-Sheet 9

INVENTOR.
WINFRED T. POWELL

BY T. L. Bowes

ATTORNEY

July 24, 1951 W. T. POWELL 2,562,123

AUTOMATIC TELEPHONE SYSTEM

Filed Aug. 22, 1947 16 Sheets-Sheet 10

INVENTOR.
WINFRED T. POWELL
BY T. L. Bowes
ATTORNEY

INVENTOR.
WINFRED T. POWELL
BY T. L. Bowes
ATTORNEY

July 24, 1951 W. T. POWELL 2,562,123

AUTOMATIC TELEPHONE SYSTEM

Filed Aug. 22, 1947 16 Sheets-Sheet 12

INVENTOR.
WINFRED T. POWELL
BY T. L. Bowes
ATTORNEY

July 24, 1951 W. T. POWELL 2,562,123

AUTOMATIC TELEPHONE SYSTEM

Filed Aug. 22, 1947 16 Sheets-Sheet 13

INVENTOR.
WINFRED T. POWELL

BY T. L. Bowes

ATTORNEY

INVENTOR.
WINFRED T. POWELL
BY T. L. Bowes
ATTORNEY

July 24, 1951 W. T. POWELL 2,562,123

AUTOMATIC TELEPHONE SYSTEM

Filed Aug. 22, 1947 16 Sheets-Sheet 15

INVENTOR.
WINFRED T. POWELL
BY T. L. Bowes
ATTORNEY

July 24, 1951 W. T. POWELL 2,562,123

AUTOMATIC TELEPHONE SYSTEM

Filed Aug. 22, 1947 16 Sheets-Sheet 16

INVENTOR.
WINFRED T. POWELL
BY T. L. Bowes
ATTORNEY

UNITED STATES PATENT OFFICE 2,562,123

AUTOMATIC TELEPHONE SYSTEM

Winfred T. Powell, Rochester, N. Y., assignor to Stromberg-Carlson Company, a corporation of New York Application August 22, 1947, Serial No. 770,119

15 Claims. (Cl. 179—18)

This invention relates to switching systems and it more particularly pertains to automatic telephone systems.

One object of the present invention relates to the provision of a suboffice, office A for example, working into a main automatic office, office B for example, the suboffice being of the all relay type.

Another object of the present invention relates to the provision of first selector repeaters in the suboffice for selecting trunks to the main office, with these first selector repeaters being arranged to drop back on certain levels and to hold on certain other levels, to provide for a universal numbering system in the network.

Still another object of the present invention relates to the provision of a combination connector in the suboffice, this connector being the last choice of a complete group of connectors for use in connection with regular calls and being the first choice connector for use by the wire chief or test clerk in the main office for establishing connections to lines in the suboffice for testing purposes.

Another and related object of the present invention relates to the use of a relay type allotter in the suboffice for allotting the connector circuits in rotation, with the above-mentioned combination connector being normally blocked from the regular allotting circuit to prevent its use, and thus keep it open for use by the test clerk for testing purposes as long as there are one or more regular connectors of the group available. When all regular connectors are busy, then the combination connector is unblocked and may be selected for local calls if not in use by the test clerk.

It is a further object of the present invention to provide an automatic marker transfer circuit, whereby circuit means are effective for transferring from one common marker to a reserve common marker in response to a failure of the regular common marker circuit. For example, the regular common marker is used during the normal operation of the system, then in the event of a failure of either the tens or units portion of the marker circuit a time delay circuit will be effective for operating and locking a switching relay, which in turn transfers all of the marker wires from the regular marker to the reserve marker and sets up an alarm condition for indicating that the reserve marker is being used in place of the regular marker. Then in the event of a failure of the reserve marker, the time delay circuit functions to transmit a major alarm to the remote office. In the event that the trouble condition of the reserve marker clears up, then the reserve marker is again placed into service. The regular marker is cut back into service by the manual operation of a key, upon the visit to the remote office of a repair man.

Other objects, purposes, and characteristic features of the present invention will be in part obvious from the accompanying drawings and in part pointed out as the description thereof progresses.

Figure 17:
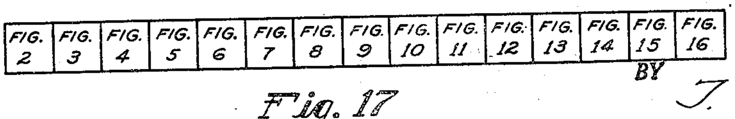

In describing the invention in detail, reference will be made to the accompanying drawings in which like reference characters designate corresponding parts and in which Figs. 2 to 16, inclusive, when arranged in accordance with the diagram of Fig. 17 and with correspondingly identified lines in alignment, disclose a sufficient amount of the detailed circuits for an understanding of the various features provided by the present invention.

Figure 1:
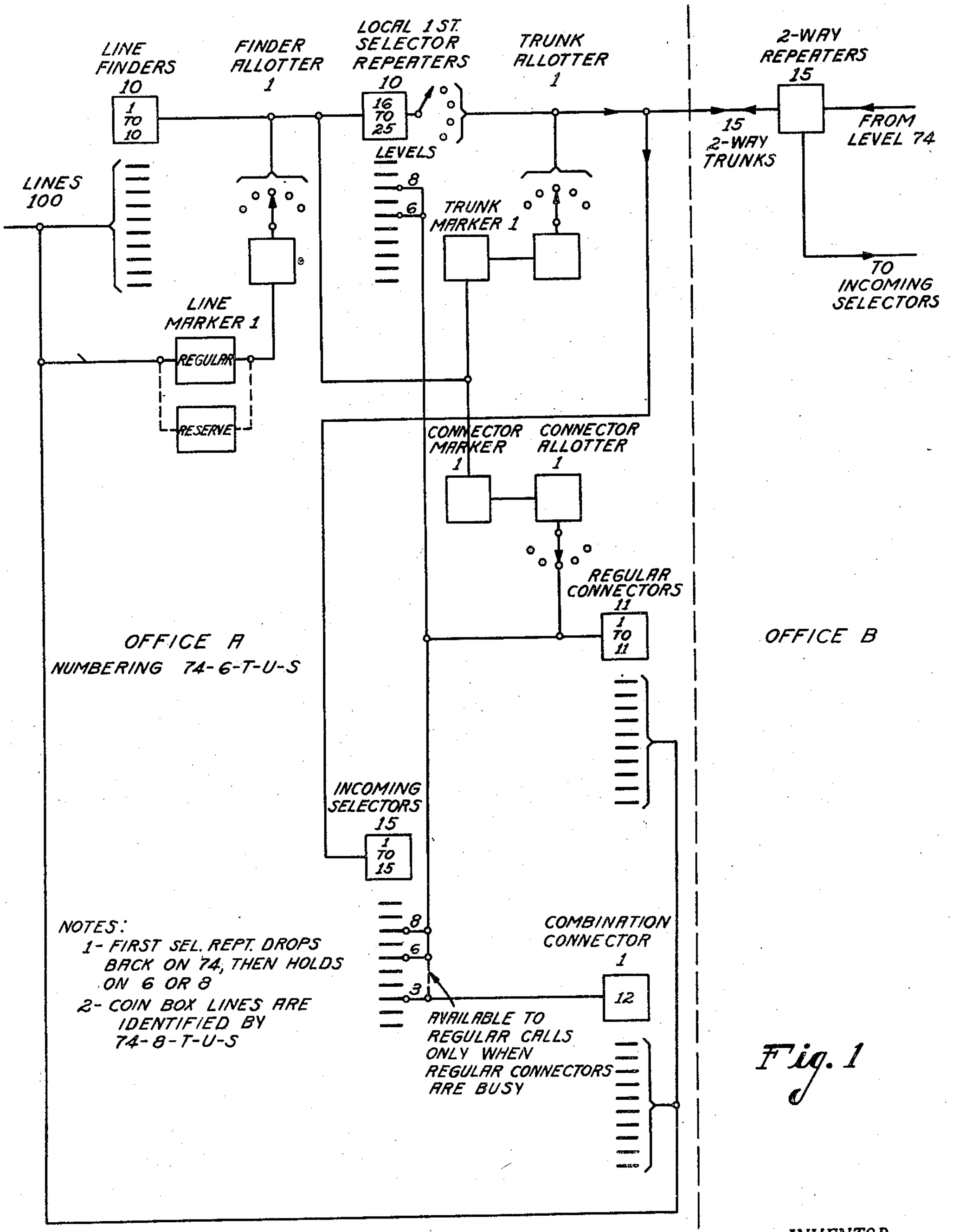

Fig. 1 is a single line block diagram illustrating in a conventional manner the layout of the system, with the various circuit elements interconnected in the suboffice and having access to two-way trunks to the main office, these two-way trunks also being accessible to calls originating in the main office and terminating in the illustrated suboffice.

For the purpose of simplifying the drawings and facilitating the explanation, the various parts and circuits constituting the embodiment of the invention have been shown diagrammatically and certain conventional illustrations have been employed, the drawings having been made more with the purpose of making it easy to understand the principles and mode of operation than with the idea of illustrating the specific construction and arrangement of parts that would be employed in practice. For example, the various relays and their contacts are illustrated in a conventional manner, with all of the contacts associated with a particular relay being indicated as controlled by this relay by means of a dashed line associating the relay coil with its contacts. Reference characters have been applied to the relays and to certain conductors which suggest a circuit function. For example, CO indicates a cut-off relay, LO indicates a lockout relay, 1TF indicates a first transfer relay, 2TF indicates a second transfer relay, 1UF indicates a first units finder relay or conductor, 2UF indicates a second finder relay or conductor, etc. Slow release relays are indicated by the usual cross-hatched section applied to the lower part of the block indicating the relay coil. Slow operate relays have a solid heavy line applied to the upper portion of the block illustrating the relay coil. Alarm and time release relays and circuits, usually provided in systems of this type have been omitted from the present disclosure, since these circuit elements may be applied in any approved manner to provide the circuit operation required, such for example as disclosed in Powell Patent 2,325,877.

Figure 2:
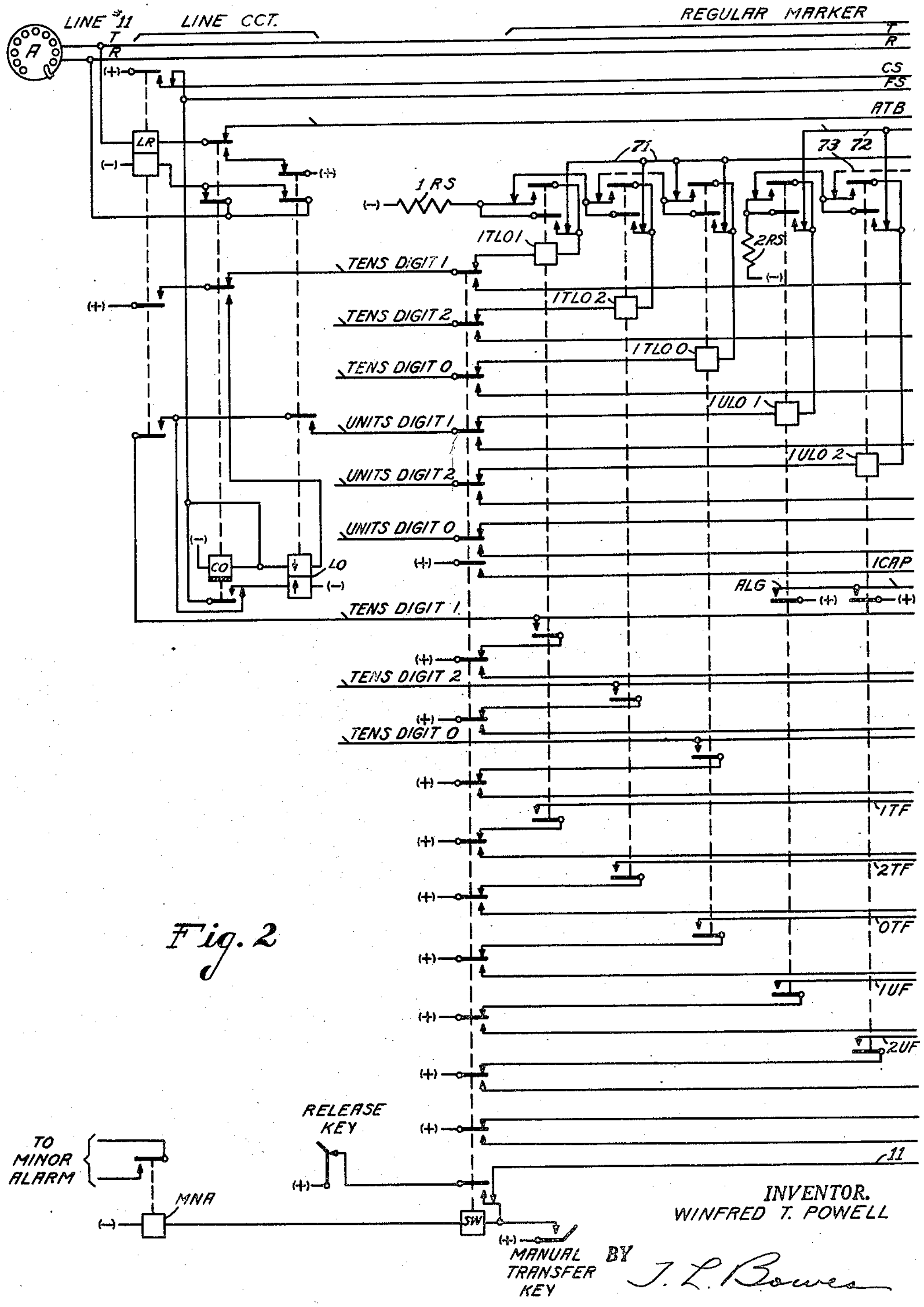
Figure 3:
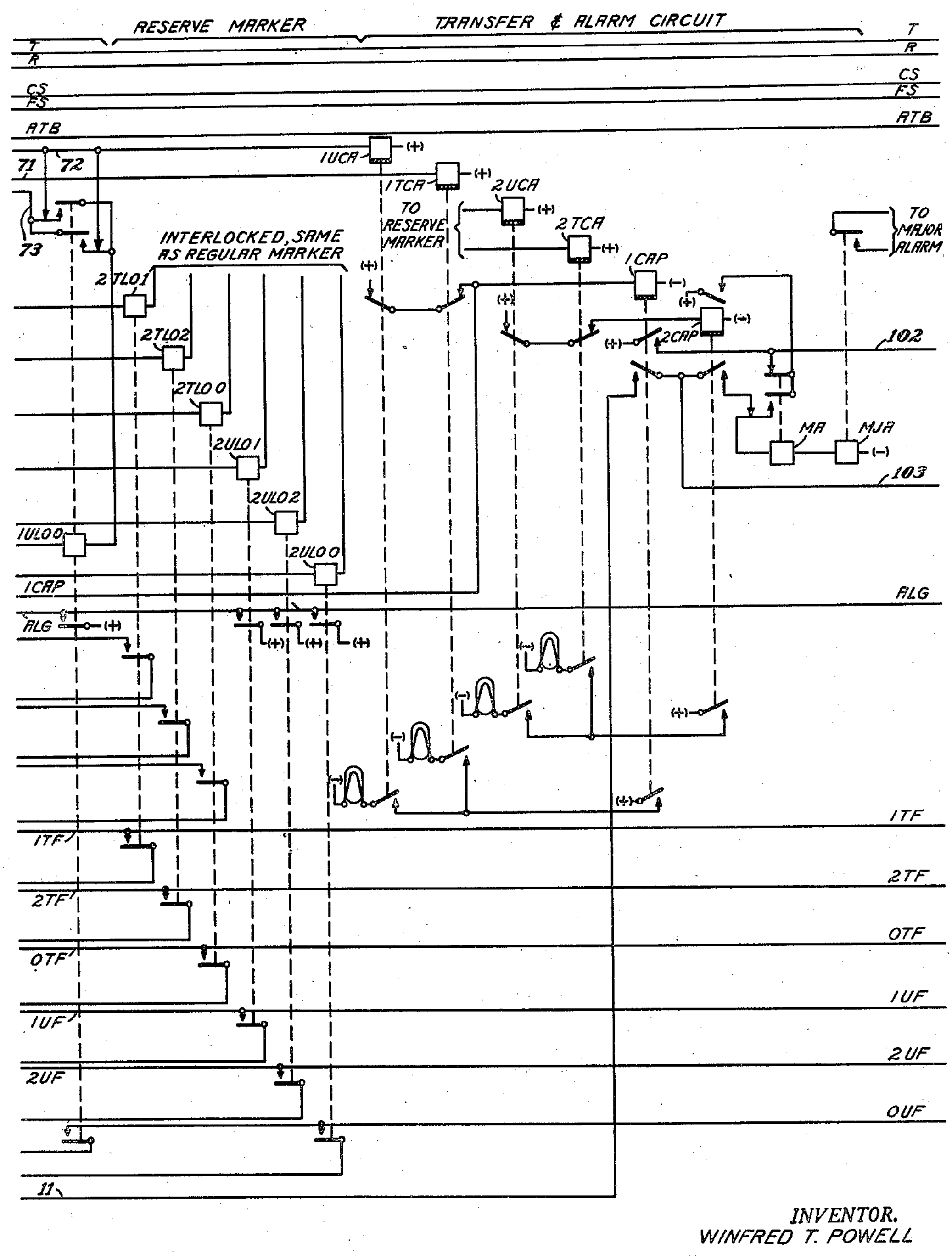
Figure 6:
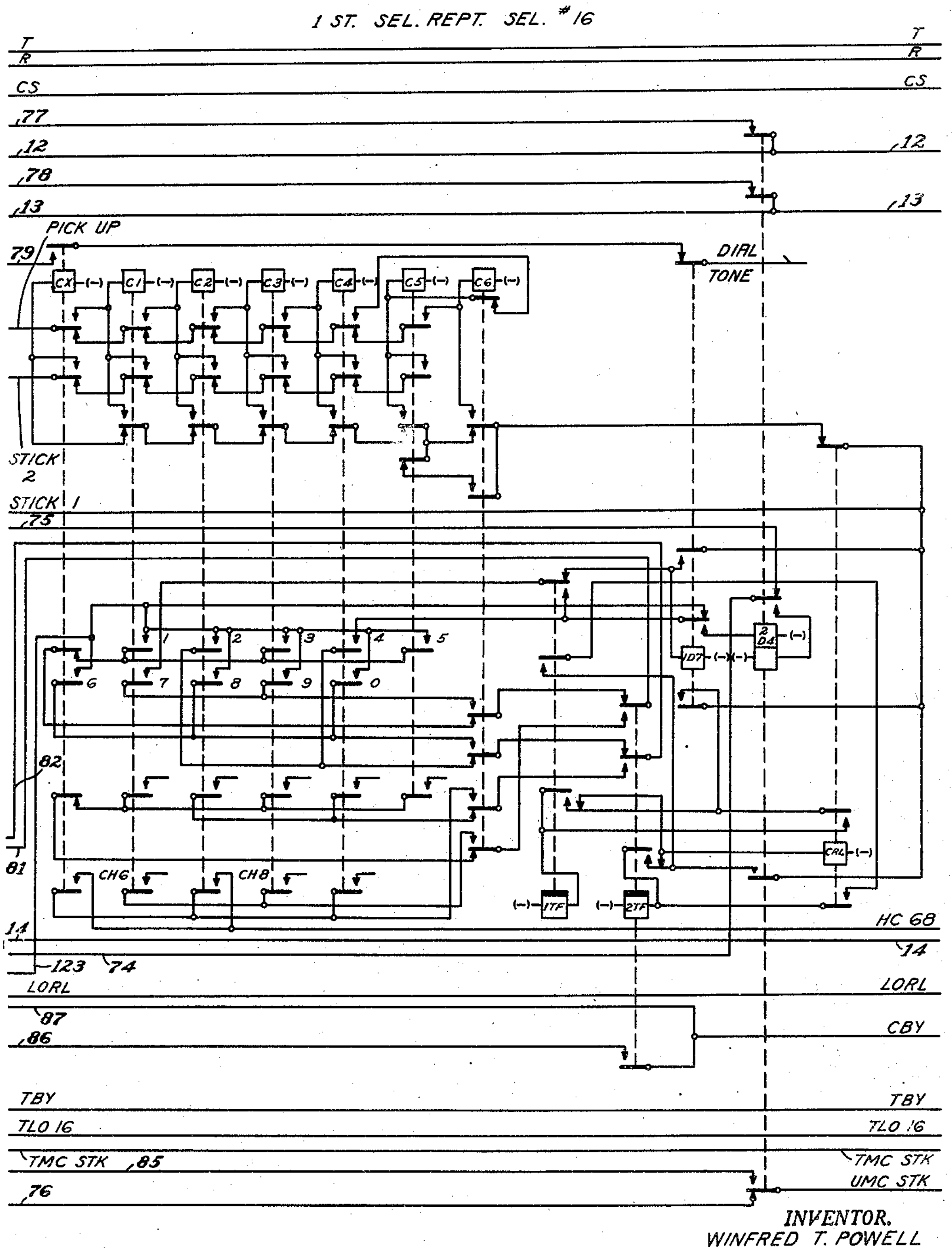
Figure 7:
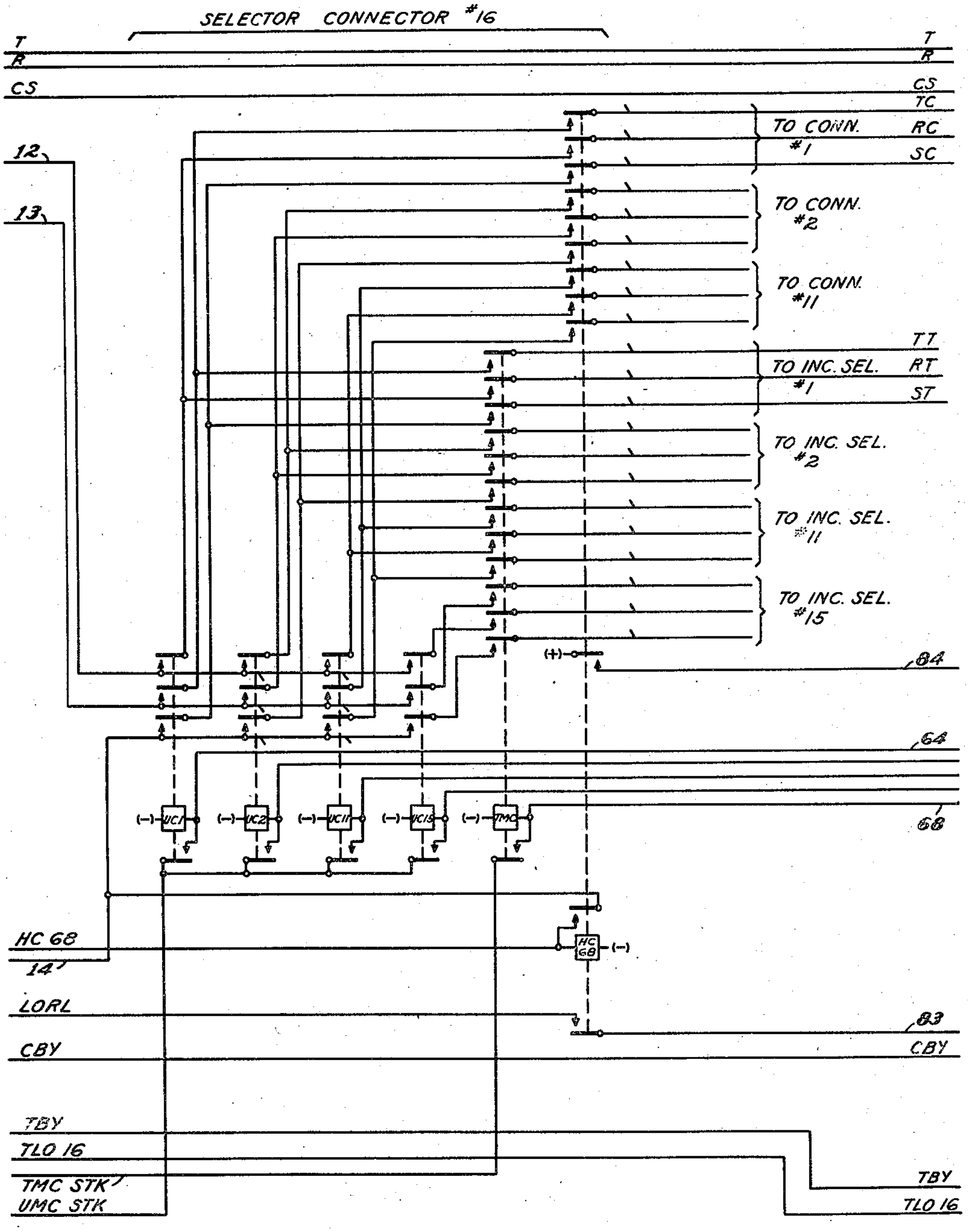
Figure 8:
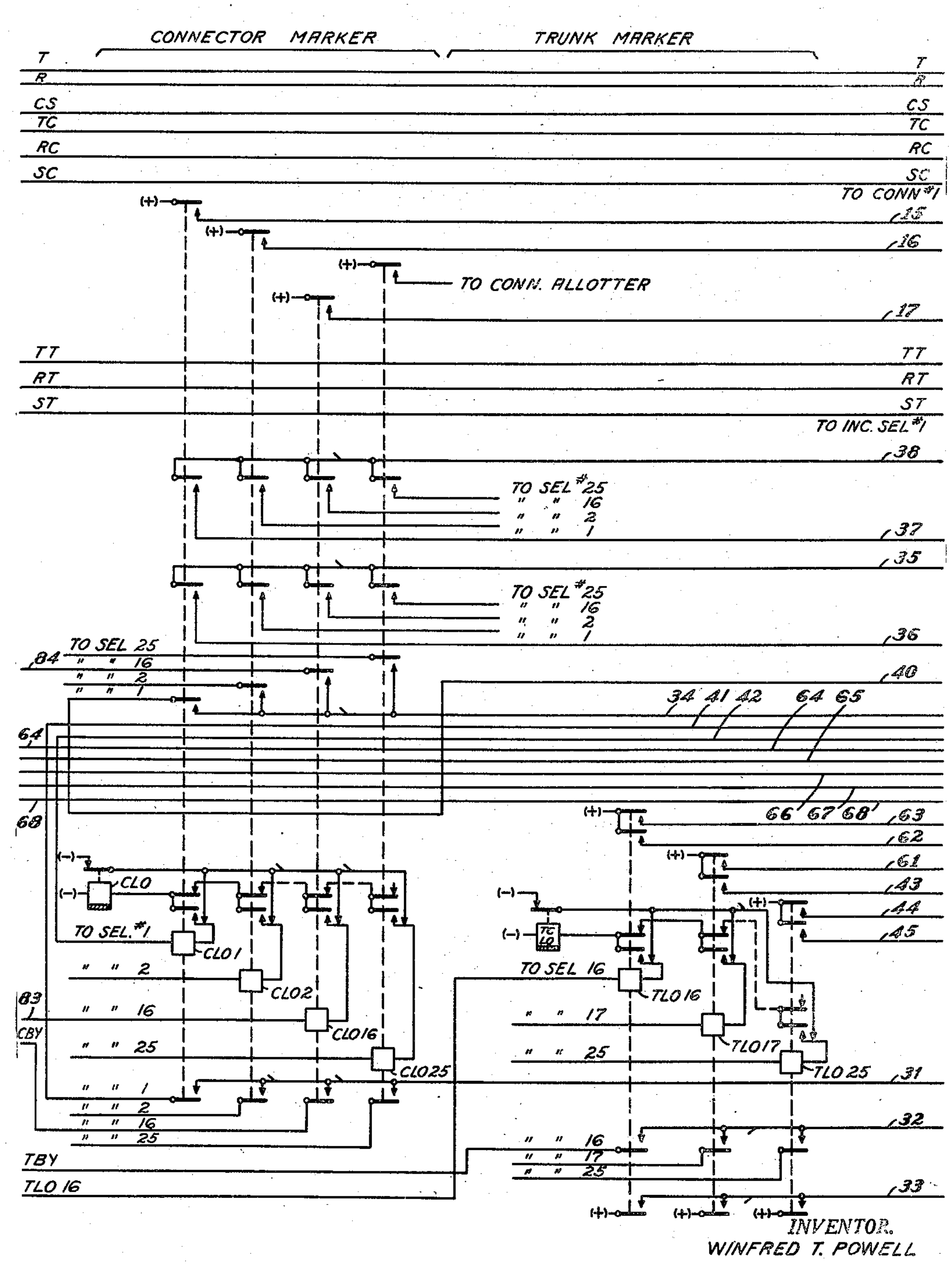
Figure 9:
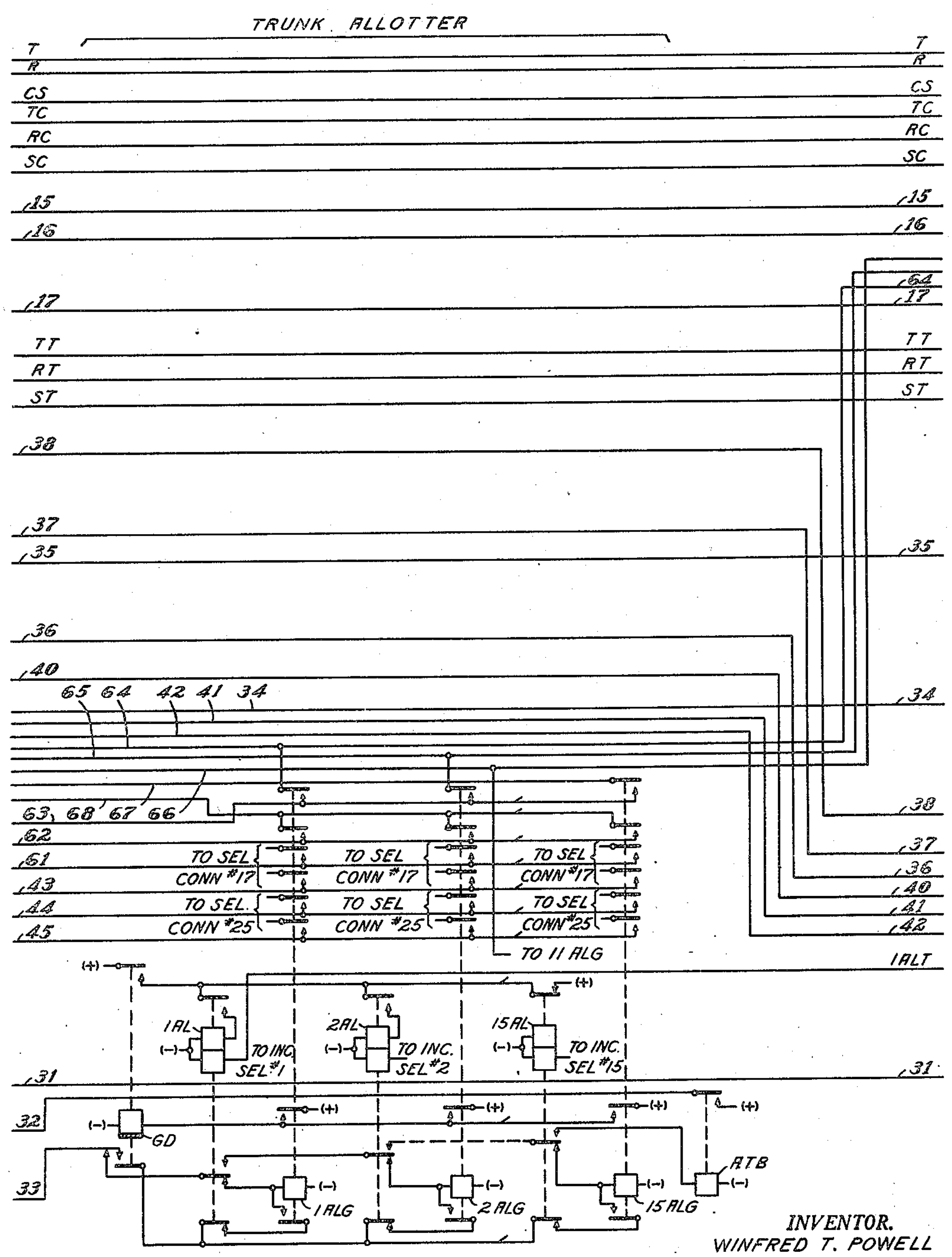
Figure 10:
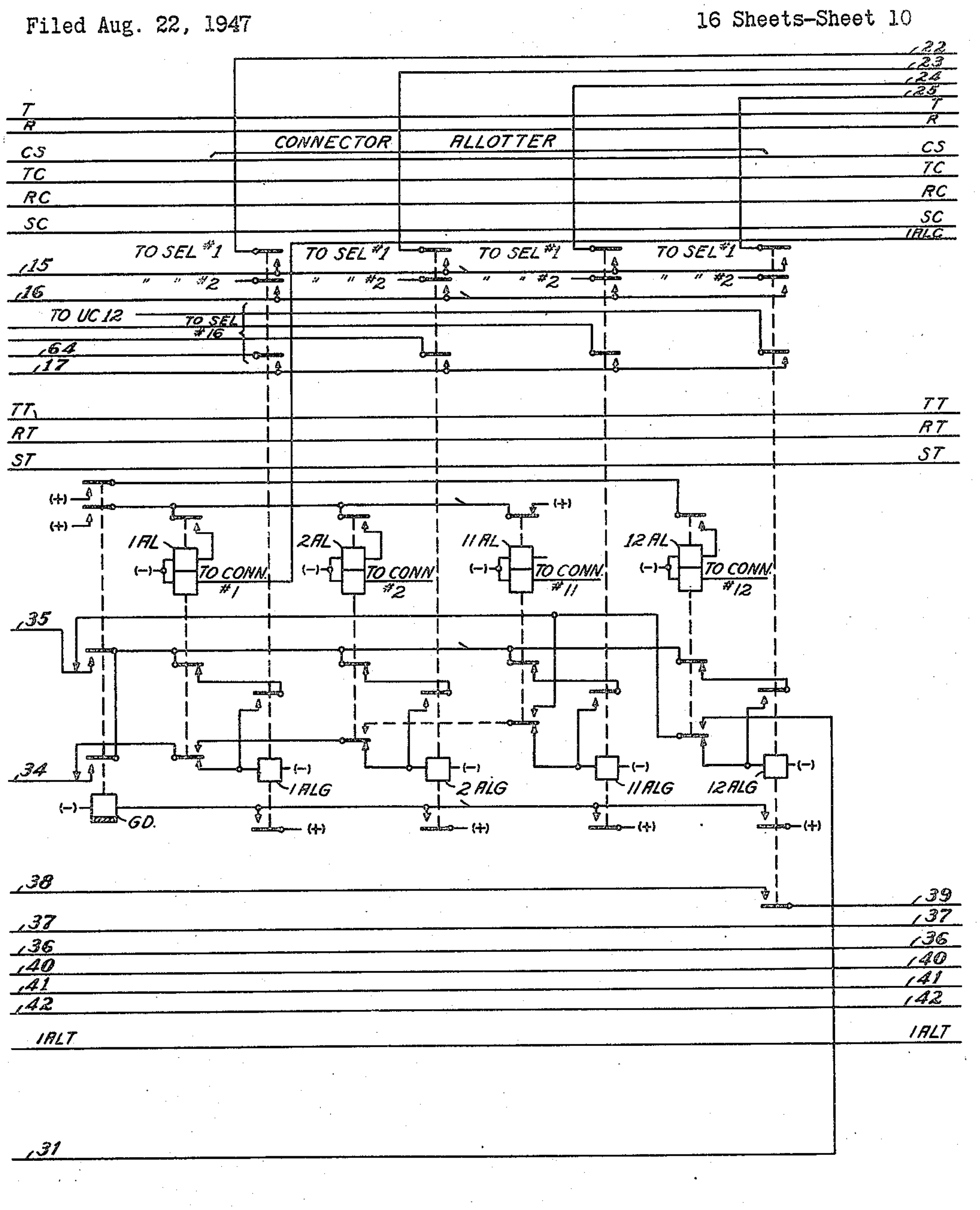

It is believed that the invention will be best understood by explaining the operation of the various circuits when a call is originated from a particular calling line, for example line No. 11 to which substation A is connected, as illustrated in the upper left hand portion of Fig. 2, the call being directed to a wanted substation by dialing a five-digit number for selecting substation B which may be connected to the terminals of the line connector relays illustrated in Fig. 6.

In describing the operation of the present invention, it will be particularly pointed out how the circuits function when the calling subscriber dials the first two digits of a number associated with the main office, for example, office B of Fig. 1 and it will then be explained how the circuits function when the first two digits dialed correspond to stations associated with the suboffice, for example office A illustrated in Fig. 1. Referring to Fig. 1, it will be assumed that the stations connected to the system of office A are six-digit numbers, the first two digits (74 for example) corresponding to the suboffice A, these two digits being dialed from any office in the network to select the equipment in the suboffice. The third digit (6 for example) operates the first selector repeater or the incoming selector to the sixth level for selecting a connector of the group located in the suboffice. Level 8 of the incoming selectors and the first selector repeaters are multipled to level 6, so that all connectors may be selected by dialing number 8 for the third digit as well as by dialing No. 6 for the third digit. This multiple arrangement of levels 6 and 8 is for the purpose of marking or indicating coin box or paystation lines to the distant operator. For example, paystation lines may all be assigned No. 8 for their third digit and since the dialing of this number for the third digit operates the equipment the same as by dialing No. 6 for the third digit, this assignment does nothing more than indicate to the tool or distant operator that the called or calling line is a coin box line.

As indicated by the dashed line connecting the last or No. 12 combination connector in with the group of the first 11 connectors, this combination connector is normally selectible from the third level of the incoming selectors only and since this number is known only to the test clerk, it is used for seizing the combination connector for test purposes from the test desk. As above mentioned and as indicated in Fig. 1, this No. 12 combination connector is used as a regular connector for regular calls only when all of the other eleven connectors are busy, thus keeping the No. 12 combination connector unblocked for use by the test desk as long as there is at least one regular connector idle for regular service.

It is believed that the operation of this system will best be understood by describing the various types of calls. The layout shown in Fig. 1 indicates that there are 100 lines in the suboffice, any one of which may be connected to any idle finder upon the initiation of a call and may be selected by any connector on a terminating call. For convenience in describing the operation of this system, it will be assumed that there are 10 line finders numbered from 1 to 10 associated with ten corresponding local first selector repeaters, numbered from 16 to 25. The 100 lines operate through a regular marker and a finder allotter for allotting the line finders for use in extending originating connections. As indicated by the dashed lines, there is a reserve marker associated with the regular marker, this reserve marker being brought into service only when the regular marker fails. The first selector repeaters have access to 15 two-way trunks leading to office B each of these two-way trunks terminating in a two-way repeater in office B. These two-way repeaters are selected from level No. 74 in office B for calls from office B to office A and are associated with corresponding incoming selectors in office B for handling incoming calls from office A. Since the features of the present invention relate to the circuits in office A and since the two-way trunk operation, including the equipment illustrated in office B, is assumed to be that in a standard automatic telephone system, which may be of the well-known step-by-step type, the operation of the equipment in office B is not shown and need not be explained in detail.

There is an incoming selector in office A normally associated with each two-way trunk for handling calls from office B to office A, these incoming selectors being numbered from 1 to 15. The eleven regular connectors are numbered 1 to 11, while the combination connector is No. 12. It will be found from the following description that the numbering of these various units as indicated is convenient for explaining the operation of the various allotter circuits.

Figure 4:
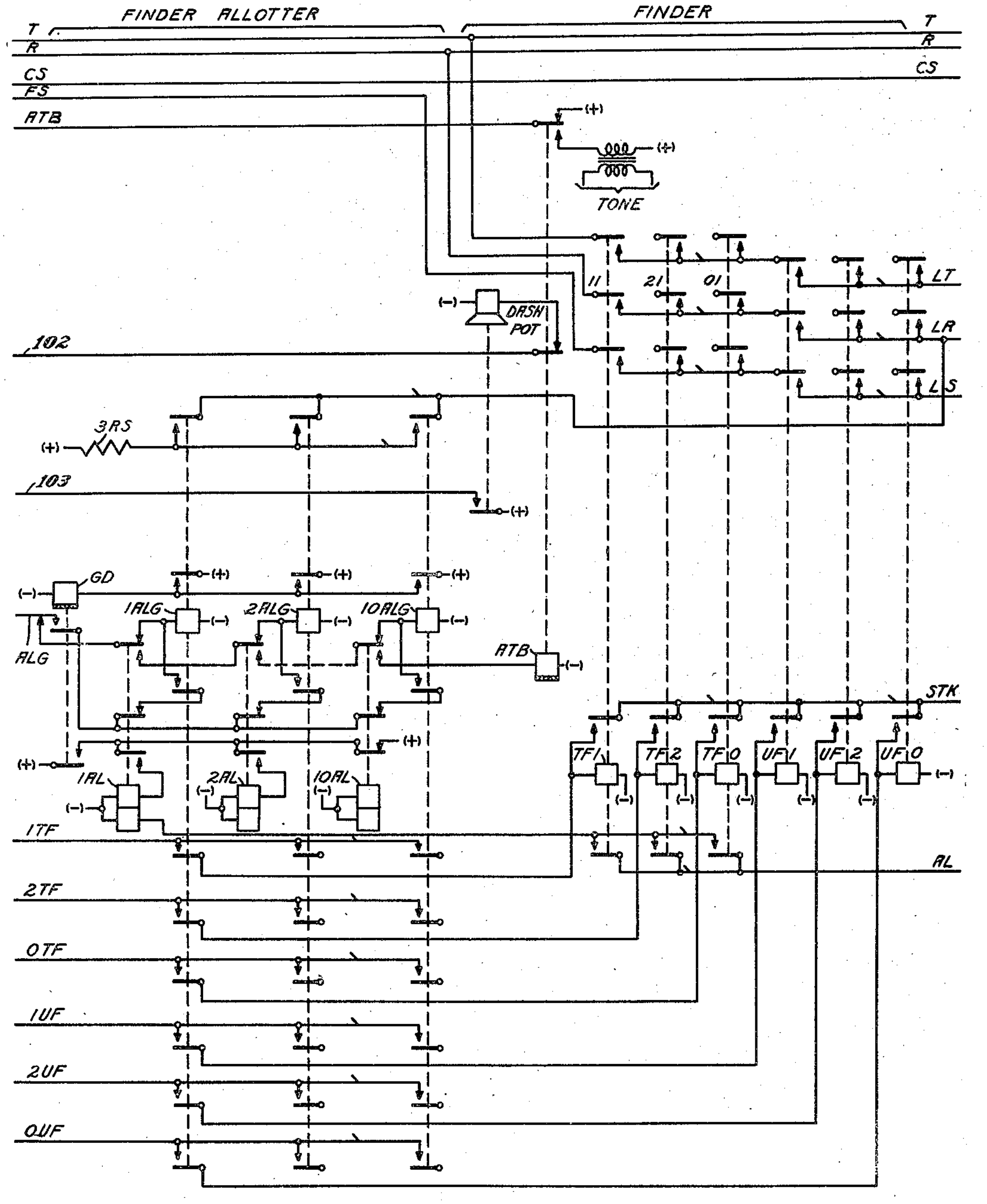
Figure 5:
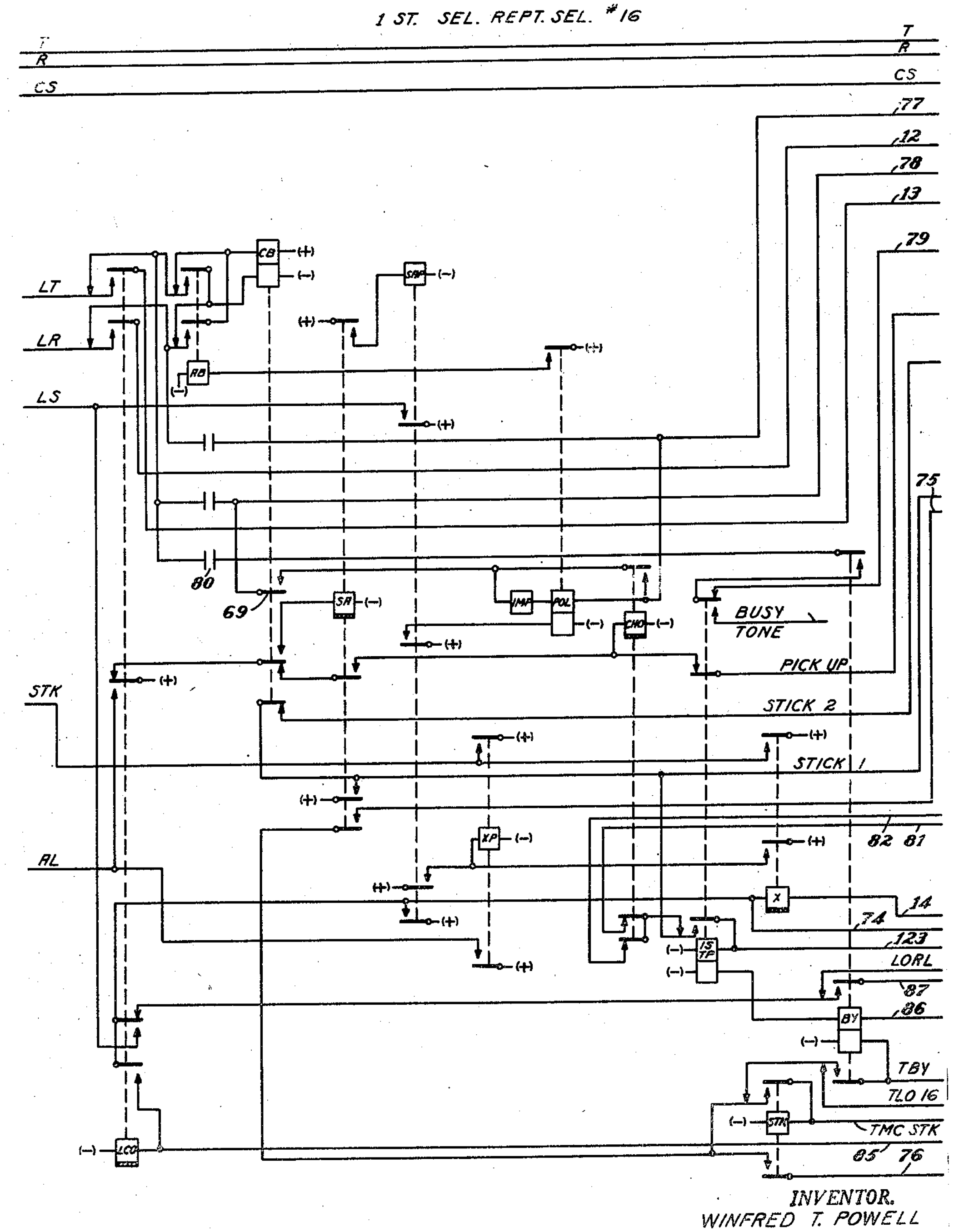

Assuming a call to be originated from station A, line 11 of Fig. 2, the closure of the line causes the operation of line relay LR over a circuit which may be traced from (+), break contact of "all trunks busy" relay ATB of Fig. 4, conductor ATB, break contact of cut-off relay CO of the line circuit, upper winding of line relay LR, tip line conductor T, substation A, ring line conductor R, break contact of relay CO and lower winding of relay LR to (−). The operation of relay LR closes a circuit for operating the tens marker relay, in this example 1TLO1 because the tens digit of the calling line is No. 1, which extends from (+), make contact of relay LR, break contact of relay CO, common tens digit conductor No. 1, break contact of switching relay SW, winding of relay 1TLO1, break contact of relay 1TLO1, conductor 71, break contact of relay 1TLO0, through a series circuit including other 1TLO relays (not shown), break contact of relay 1TLO2, break contact of relay 1TLO1 and resistor 1RS to (−). Relay 1TLO1 operates and closes a locking circuit for itself from (−), resistor 1RS, make contact and winding of relay 1TLO1 and over the remainder of the previously described circuit to (+) at a front contact of relay LR. The operation of relay 1TLO1 opens up the above described series circuit to (−), thus preventing the operation of any other 1TLO relay while the first operated relay of this group remains in its operated condition. It will be observed from the marker circuit that the operation of any one of these 1TLO relays is effective, when a call is originated from a line with a corresponding tens digit, for locking itself operated and for opening up the above described series circuit. This provides an interlock for the tens marker relays to prevent more than one being operated at any one time.

The operation of relay 1TLO1 closes a circuit for operating lockout relay LO of the calling line which extends from (+), break contact of relay SW, make contact of relay 1TLO1, tens digit No. 1 common conductor extending to the line relays of all lines having tens digit No. 1, make contact of relay LR, break contact of relay CO and lower winding of relay LO to (—).

The operation of relay LO now closes a circuit for operating the units lockout relay corresponding to the units digit of the calling line. Since it is assumed that the units digit of the calling line is No. 1, relay 1ULO1 is operated over a circuit extending from (+) on tens digit No. 1 common conductor (above traced), make contact of relay LR, make contact of relay LO, common units digit No. 1 conductor, break contact of relay SW, winding of the No. 1 units marker relay 1ULO1, break contact of relay 1ULO1, conductor 72, break contact of relay 1ULO0, conductor 73, through the series circuit including break contacts of other 1ULO relays (not shown), break contact of relay 1ULO2, break contact of relay 1ULO1 and resistor 2RS to (—). Relay 1ULO1 closes a locking circuit for itself from (—) through resistor 2RS, make contact and winding of relay 1ULO1 and over the previously described circuit to (+) on common units digit No. 1 conductor. The units marker relays are interlocked in a manner similar to the tens marker relays to prevent the operation of more than one of these units marker relays at any one time in the event of simultaneous calls.

The operation of relay 1ULO1 (or any other units marker relay) closes a circuit for operating allotter relay 1ALG of the allotter illustrated in Fig. 4, extending from (+), make contact of the 1ULO1 relay, conductor ALG, break contact of guard relay GD of the allotter, break contact of allotter relay 1AL and winding of the allotter group relay 1ALG to (—). This operation of relay 1ALG assumes that the first line finder is idle and may thus be allotted for this call. The operation of relay 1ALG (or any other ALG relay of the allotter) closes an obvious circuit for operating relay GD. The operation of relay GD transfers the above described circuit for relay 1ALG from the uppermost break contact of relay 1AL to the middle upper break contact of relay 1AL and a make contact of 1ALG for locking this latter relay operated.

It will be understood that the AL relay of a line finder is in its operated position as long as this finder is in use, thus extending the above operating circuit for the ALG relay to one of these relays which is associated with an idle line finder. The circuit for operating the AL relay of an associated line finder will be later described. At this point, however, it will be pointed out that any AL relay which is operated, establishes a locking circuit for itself by way of its upper winding for maintaining the AL relay operated until relay GD is released, as will later be described, thus preventing interference by the dropping out of a finder while another finder is being allotted. Furthermore, the locking circuits for all AL relays, except the last, are completed through a normally closed break contact of the last allotter relay of the group, thus causing the finder links to be allotted in straight-forward rotation, even though an earlier finder of the group is released before all of the finders of the group become busy. This is because the release of an earlier finder does not permit the release of its associated AL relay as long as the last finder of the group is not in use.

With relays 1TLO1 and 1ULO1 of the marker operated and with relay 1ALG of the allotter operated, all as previously explained, the line finder relays of the No. 1 line finder are operated for selecting the calling line, in this example tens finder relay TF1 and units finder relay UF1 because the tens and units digits of the calling line are both No. 1. The circuit for operating relay TF1 of the allotted line finder may be traced from (+), break contact of relay SW, make contact of relay 1TLO1, conductor 1TF, make contact of allotter relay 1ALG and winding of relay TF1 to (—). The circuit for operating units finder relay UF1 may be traced from (+), break contact of relay SW, make contact of relay 1ULO1, conductor 1UF, make contact of relay 1ALG and winding of relay UF1 to (—).

The operation of the tens and units finder relays (in this example relays TF1 and UF1) extends the calling line to the first selector repeater associated with the line finder used for this call. The extension of this line circuit to this first selector repeater closes a circuit for operating the calling bridge relay CB of the first selector repeater which extends from (+), upper winding of relay CB, break contact of answering bridge relay AB, break contact of link cut-off relay LCO, link tip conductor LT, make contacts of relays UF1 and TF1 in series, tip line conductor T, calling substation, ring line conductor R, make contacts in series of relays TF1 and UF1, link ring conductor LR, break contact of relay LCO, break contact of relay AB and lower winding of relay CB to (—). This energizing circuit for relay CB maintains this relay operated until the dial impulses are transmitted. However, just previous to the extension of the calling line to the windings of this relay, a preliminary operating circuit is closed for locally operating relay CB, which circuit is independent of the calling line and which may be traced from (+), resistor 3RS, make contact of the operated ALG relay, link ring conductor LR and over the above described circuit to the lower winding of relay CB. It will be understood that this preliminary impulse circuit is de-energized after sufficient time has been measured off to make sure that the calling line is connected to the windings of relay CB, by the release of the operated ALG relay as will be later explained.

The operation of relay CB of the first selector repeater closes a circuit for operating the slow acting relay SA which extends from (+), break contact of relay LCO, make contact of relay CB and winding of relay SA to (—). The operation of relay SA closes an obvious circuit for operating its repeater relay SAP. The operation of relay SAP closes an obvious circuit for operating relay XP, this latter relay being for use particularly in connection with reverting calls, as will later be explained. The relay XP connects (+) to stick conductor STK for locking the operated line finder relays in their operated positions. The operation of relay SAP applies (+) to link sleeve conductor LS for operating relay CO of the calling line. This circuit may be traced from (+) on conductor LS, make contacts of relays UF1 and TF1, finder sleeve conductor FS and winding of relay CO to (—). The operation of relay CO (since relay LO is already operated) removes the battery bridge of the line circuit from the calling line, thus effecting the release of relay LR. The operation of relay CO opens up and releases relay 1TLO1, while the release of relay LR opens up and releases relay 1ULO1.

The operation of relay SAP energizes the polarizing winding of polar relay POL, so that this relay is in condition for responding to reverse battery when the called party answers. Relay POL of course does not operate when its lower winding alone is energized. The operation of relay XP applies (+) to allotter conductor AL for operating relay 1AL of the allotter, this circuit being traced from conductor AL through a make contact of the operated TF relay of the line finder and lower winding of relay 1AL to (−). The operation of relay 1AL closes the above described locking circuit for its upper winding. The operation of relay 1AL opens up the operating and locking circuits of relay 1ALG for releasing this relay, which in turn opens up and releases relay GD.

The release of the marker relays 1TLO1 and 1ULO1 restores the marker circuit to normal for use on a succeeding call and the release of relay GD of the allotter permits allotting the next link for the next succeeding call.

Referring to the first selector repeater circuit, the operation of relay SA closes a circuit for operating the priming relay CX of the associated counting chain. This operation of relay CX prepares the counting circuit for receiving the impulses of the digits dialed into this circuit. The circuit for operating relay CX extends from (+), make contact of relay SA, conductor "stick 1," break contact of counter release relay CRL, break contacts in series of counting relays C6 to C1 inclusive and winding of relay CX to (−).

Referring to the layout of Fig. 1, it will be noted that an originating call in suboffice A is effective to associate the calling line with an idle first selector repeater by means of the associated line finder, in the manner just described. An originating call must also cause the first selector repeater to select an idle two-way trunk to office B before any dialing operation is effected. This is for the reason that a trunk circuit to office B is used throughout the connection if the call is directed to any station outside the suboffice A. In the event that the call is for a station in suboffice A, then when the first two digits (74) are dialed the first selector repeater disassociates itself from the interoffice trunk and is then directed by the third digit (No. 6) to the sixth level for selecting a connector, the connector then being responsive to the tens, units and stations digits of the called station.

With relays CB, SA, SAP and XP of the first selector repeater operated as above described, a circuit is closed for operating relay TLO16 of the trunk marker. This relay is designated TLO16 because it is associated with the No. 16 selector of the complete group of 25. The circuit for operating relay TLO16 extends from (+), lower-most make contact of relay SAP, conductor 74, break contact of relay 2D4, conductor 75, lower-most make contact of relay SA, break contacts in series of the continuity spring combinations of relays STK, and BY, conductor TLO16, winding of relay TLO16, break contact of relay TLO16 and break contact of trunk marker common lockout relay TCLO to (−). The operation of relay TLO16 closes, at its continuity make contact, a locking circuit for itself which includes the winding of relay TCLO, thus operating this latter relay for opening up the circuit to (−) for all TLO relays of the group for preventing the operation of more than one of these relays at any one time.

The operation of relay TLO16 closes a circuit for operating the allotter group relay of the trunk allotter associated with the idle assigned trunk. Assuming that trunk No. 1 is idle, the 1ALG relay will be operated over a circuit extending from (+), lower-most make contact of relay TLO16 (or any other TLO relay which may have been operated), conductor 33, break contact of relay GD, break contact of relay 1AL and winding of relay 1ALG to (−). The operation of relay 1ALG (or any other ALG relay of this allotter) closes an obvious circuit for operating relay GD, which in turn transfers the circuit of relay 1ALG from its above described operating path to a locking path including a make contact of relay GD, break contact of relay 1AL, make contact and winding of relay 1ALG to (−).

Since the operation of relay 1ALG marks the first two-way trunk to office B as the one to be selected by the first selector repeater, it is now necessary to operate relays TMC and UC1 of this selector repeater for extending the outgoing side of the selector repeater to the selected trunk circuit. The circuit for operating relay TMC may be traced from (+), make contact of relay TLO16, conductor 62, make contact of relay 1ALG, conductor 68 and winding of relay TMC to (−). The circuit for operating relay UC1 may be traced from (+), make contact of relay TLO16, conductor 63, make contact of relay 1ALG, conductor 64 and winding of relay UC1 to (−). The operation of relay TMC closes a circuit for operating stick relay STK of the first selector repeater, which may be traced from (+) on the right hand terminal of the winding of relay TMC (above traced), make contact of relay TMC, conductor TMC STK and winding of relay STK to (−). Relay STK closes a locking circuit for itself extending from (+), lower-most make contact of relay SAP, conductor 74, break contact of relay 2D4, conductor 75, lower-most make contact of relay SA, make contact and winding of relay STK to (−). This locking circuit for relay STK is extended by way of its lower make contact, conductor 76 and lower-most break contact of relay 2D4 to conductor UMC STK and make contact of relay UC1 to the winding of this relay for locking it in its operated position. Relay TMC is now locked in its operated position to the (+) which locks relay STK, now extended back by way of conductor TMC STK and make contact of relay TMC to its winding.

The opening up of the break contact of the continuity combination of relay STK opens up conductor TLO16 which extends to the winding of relay TLO16 for releasing this relay. This also opens up and releases relay TCLO of the trunk marker, thus restoring the circuits of this marker to normal in preparation for the next call. The release of relay TLO16 removes (+) from conductor 33 which effects the release of relay 1ALG and this relay in turn opens up and releases relay GD for preparing the trunk allotter for the next call. Before relay 1ALG is released, however, relay 1AL of the trunk allotter is operated by the operation of relay SW (later explained) of the incoming selector associated with the selected trunk, this relay applying (+) to conductor 1ALT for operating relay 1AL, which relay locks by way of its upper winding until the last allotter relay of the trunk allotter is operated.

The circuit for operating relay SW of the incoming selector may be traced from (+), lower-most make contact of relay SAP of the first selector repeater, winding of relay X, conductor 14, make contact of relay UC1 of the selector connector, make contact of relay TMC of the selector connector, sleeve conductor ST of the trunk circuit and winding of relay SW to (−).

The operation of relay SW of the incoming selector disconnects the tip and ring trunk conductors MT and MR leading to office B from the windings of relay CB of the incoming selector (since this incoming selector is not to be operated on this call) and connects these trunk conductors to the tip and ring conductors TT and RT leading back to relay TMC of the selector connector and then through make contacts of this relay and make contacts of relay UC1 to conductors 12 and 13. Conductor 12 may now be traced through the upper-most break contact of relay 2D4, conductor 77, upper winding of relay POL, impedance coil IMP, make contact of relay CB, conductor 78 and break contact of relay 2D4 to conductor 13, thus establishing a closed circuit across the tip and ring conductors of the two-way trunk to office B. This prepares the circuits for receiving and repeating dial impulses. Relay 1AL of the trunk allotter is operated when relay SW of the incoming selector is operated to mark this trunk busy, over the previously described circuit including conductor 1ALT.

Since the calling line in office A is now connected through a local first selector repeater to a two-way trunk leading to office B, the dial tone supplied from office B (not shown) is fed back over the two-way trunk circuit and may be traced from the tip side MT of the trunk (Fig. 11), make contact of relay SW of the incoming selector, trunk tip conductor TT, make contact of relay TMC of the selector connector, make contact of relay UC1 of the selector connector, conductor 13, break contact of relay 2D4, conductor 78, condenser, break contact of relay LCO of the first selector repeater, conductor LT, make contacts of the line finder relays UF1 and TF1, line conductor T, calling line circuit, conductor R, make contacts of relays TF1 and UF1 of the line finder, conductor LR, break contact of relay LCO of the first selector repeater, condenser, conductor 77, break contact of relay 2D4, conductor 12, make contact of relay UC1, make contact of relay TMC, conductor RT, make contact of relay SW and trunk conductor MR to the distant office.

The impulses transmitted from the calling dial effect the operation of relay CB of the first selector repeater for repeating these impulses over the interoffice trunk circuit. It will first be assumed that this call is for a station in office B or some other office in the network besides office A. This means that the first two digits will be something else besides 74, since 74 for the first two digits direct the call back into office A. In other words, the first selector repeater does not drop back unless 74 are the first digits dialed.

The impulses of the called number are now repeated by contact 69 of relay CB. This contact opens and closes the above described interoffice trunk circuit including conductors MT and MR connected to the contacts of relay SW of the incoming selector. At the first release of relay CB, a circuit is closed for operating relay CHO extending from (+), break contact of relay LCO, break contact of relay CB, make contact of relay SA and winding of relay CHO to (−).

The operation of relay CHO short-circuits the upper winding of relay POL and coil IMP for thus connecting the two interoffice trunk conductors directly to impulse contact 69 of relay CB, whereby the impulses are repeated over the interoffice trunk by this contact.

Since the repeating of these impulses effects the operation of the step-by-step automatic switches in the distant office or offices, it is not believed necessary to illustrate or describe this impulse repeating operation. The response of the called party in the distant office effects the reversal of the battery supply to the trunk circuit for reversing the current flow through the upper winding of relay POL of the first selector repeater, whereby answering bridge relay AB is operated over an obvious circuit for repeating this reverse battery supervisory or signalling circuit back to the calling station in office A.

In the event that all of the trunks leading to office B are busy, relay BY of the first selector repeater is operated when the trunk allotter tries to allot one of these trunks. When all trunks to the distant office are busy, all of the AL relays of the trunk allotter will be in their operated positions. This is because all ALT wires will be connected to (+), either at make contacts of the SW relays on outgoing calls or at make contacts of the SA relays (Fig. 11) on incoming calls. Consequently, when the trunk marker relay is operated, for example relay TLO16 as above described, the circuit from (+) applied to conductor 33 is extended through a break contact of relay GD and all make contacts in series of the AL relays to the "all trunks busy" relay ATB. Relay ATB operates and applies (+) to conductor 32 which extends back through a make contact of relay TLO16 and by way of trunk busy conductor TBY to the lower winding of relay BY for operating this relay. Relay BY closes a locking circuit for itself extending from (+), lower-most make contact of SAP, conductor 74, break contact of relay 2D4, conductor 75, lower-most make contact of relay SA, break contact of relay STK, make contact and lower winding of relay BY to (−). Since all trunks to the distant office are busy and consequently all AL relays of the trunk allotter are in their operated positions, no ALG relay of the trunk allotter is operated and consequently relay TMC and relay UC1 of the first selector repeater are not operated at this time. Since relay TMC is not operated, there is no circuit completed for operating relay SW of the incoming selector of any interoffice trunk and consequently no interoffice trunk is selected. The operation of relay BY opens up conductor TLO16 for releasing relay TLO16 of the trunk marker and common relay TCLO of the trunk marker.

On a call for a station in office A when there is no idle trunk to office B, the impulses are effective to operate the equipment in office A only. It becomes necessary, however, to apply dial tone to the calling station from the first selector repeater, this circuit being traced from the dial tone conductor (Fig. 6), break contact of relay 1D7, make contact of relay CX, conductor 79, break contact of relay 1STP, make contact of relay BY, condenser 80 and over the calling line circuit to the calling station. When the first impulse of the first digit is transmitted, relay CX is released for disconnecting the dial tone source from the calling line, and since relay 2D4 will be operated (as later described) in response to dialing the first two digits 7 and 4, the above described locking circuit for relay BY is opened at the inner upper break contact of relay 2D4 for releasing relay BY and opening up the dial tone circuit at a point which remains open during the remainder of this connection. The release of relay TLO16 removes (+) from conductor 33 for releasing relay ATB of the trunk allotter and this relay in turn removes (+) from conductor 32 for preventing the operation of the busy relay of the first selector repeater on a subsequent call when there is an idle interoffice trunk available.

It will now be explained how the circuits function in response to the dialing of 74 to mark this call as one which terminates in suboffice A. In response to the seven interruptions in the line circuit produced by the dial, relay CB of the first selector repeater is intermittently released for transmitting seven impulses to the counting chain of the first selector repeater, as well as for transmitting seven impulses over the interoffice trunk circuit, for operating the switches in office B, the latter impulse transmitting circuit being controlled at contact 69 of relay CB. This steps the incoming selector in office B to the seventh level in a well known manner. The first release of relay CB closes a circuit for operating counting relay C1 extending from (+), break contact of relay LCO, break contact of relay CB, make contact of relay SA, break contact of relay 1STP, "pick up" conductor, make contact of relay CX and winding of relay C1 to (—). In addition to operating relay C1, this released condition of relay CB closes a circuit over a portion of the above described path to the winding of change over relay CHO for operating this relay at the beginning of the transmission of impulses. Since relay CHO is of the slow release type, it will remain operated during the transmission of the impulses and will release at the end of this transmission.

The first release of relay CB prevents the release of relay CX by means of a locking circuit for this relay extending from (+), second lower make contact of relay SA, break contact of relay CB, "stick 2" conductor, make contact and winding of relay CX to (—). At the end of this first impulse, relay CB operates to open the above described locking circuit for relay CX and since the operating circuit of relay CX is open at a break contact of relay C1, relay CX is released. Relay C1 remains operated by means of a locking circuit for itself extending from (+), second lower make contact of relay SA, "stick 1" conductor, break contact of relay CRL, break contacts in series of relay C6 to C2, inclusive, make contact and winding of relay C1 to (—).

In response to the release of relay CB for the second impulse, a circuit is closed for operating relay C2 extending from (+) on the "pick up" conductor as previously described, break contact of relay CX, make contact of relay C1 and winding of relay C2 to (—). Relay C1 is prevented from releasing at this time by means of the above described circuit on the "stick 2" conductor which now extends through a break contact of relay CX, make contact and winding of relay C1 to (—). When relay CB operates at the end of the second impulse, relay C1 is released because one locking circuit is now open at a break contact of relay C2 and the other locking circuit, including conductor "stick 2," is now open at a break contact of relay CB.

In response to the release of relay CB for the third impulse, a circuit is closed for operating relay C3 extending from (+) on the "pick up" conductor, break contacts in series of relays CX and C1, make contact of relay C2 and winding of relay C3 to (—). Relay C2 is prevented from releasing at this time by means of (+) on the "stick 2" conductor extending through break contacts in series of relays CX and C1 and make contact of relay C2 to its winding. When relay CB is energized at the end of the third impulse, relay C2 is released because its holding circuit is now open at a break contact of relay C3 and its locking circuit, including conductor "stick 2," is now open at a break contact of relay CB. Relay C3 is locked operated at this time by means of (+) on the "stick 1" conductor which now extends through a make contact and winding of relay C3 to (—).

When relay CB is released at the beginning of the fourth impulse, the circuit from (+) on the "pick up" conductor is extended through break contacts of relays CX, C1 and C2 in series and make contact of relay C3 to the winding of relay C4 for operating this relay. Relay C3 is locked operated at this time from (+) on the "stick 2" conductor which now extends through break contacts of relays CX, C1 and C2 and a make contact of relay C3 to the winding of this relay. When relay CB is operated at the end of the fourth impulse, C3 is released because one locking circuit is now open at a break contact of relay C4 (now closed to relay C4 for locking this relay operated) and the other locking circuit, including conductor "stick 2," is open at the break contact of relay CB.

When relay CB is released at the beginning of the fifth impulse, the "pick up" conductor is again energized and since this conductor is now extended through a make contact of relay C4 and break contact of relay C6 to the winding of relay C5, this latter relay is operated. Relay C5 closes a first locking circuit for itself from (+) on the "stick 1" conductor and opens the above locking circuit for relay C4 which included this conductor, but relay C4 is locked operated by means of (+) on conductor "stick 2" which is now connected to the winding of relay C4. When relay CB is operated at the end of the fifth impulse, relay C4 is released because its locking circuit including conductor "stick 2" is now open at the break contact of relay CB and its locking circuit including conductor "stick 1" is now open at a break contact of relay C5.

When relay CB is released at the beginning of the sixth impulse, a circuit is closed for operating relay C6 extending from (+) on the "pick up" conductor, break contacts in series of relays CX to C4, inclusive, make contact of relay C5 and winding of relay C6 to (—). Relay C5 is prevented from releasing at this time because it is locked to (+) on the "stick 2" conductor. When relay CB operates at the end of the sixth impulse, (+) is removed from the "stick 2" conductor for effecting the release of relay C5.

With relay C6 operated, the circuit from (+) on the "stick 1" conductor is connected to the winding of this relay for maintaining it in its operated condition throughout the transmission of the remaining impulses of the series. This "stick 1" conductor is extended through a make contact of relay C6 and break contacts in series of relays C5 to C1, inclusive, to the winding of relay CX for again operating this relay, thus preparing the counting chain for receiving the remaining impulses of the series. In this manner, counting relays C1 to C4 are used over again for selectively counting impulses 7, 8, 9 and 10. If the impulse transmission stops at this point (only six impulses transmitted) relay CX is operated for selecting channel circuit No. 6 as indicated at its numbered make contact. In this example, however, the seventh impulse is transmitted for releasing relay CB which again applies (+) to the "pick up" conductor for again operating relay C1. Relay C1 is now locked to (+) on the "stick 1" conductor, the circuit now extending through a make contact of relay C6, break contacts of relay C5, break contacts in series of relays C4, C3 and C2 and make contact of relay C1 to the winding of this relay. Relay CX is maintained operated as before by the (+) applied to the "stick 2" conductor. At the end of the seventh impulse, relay CB opens up the "stick 2" conductor for releasing relay CX and since the "pick up" conductor is now deenergized for a comparatively long interval of time, relay CHO is released.

This explains the circuit operations in response to the transmission of the seven impulses of the first digit and it is believed obvious from the above explanation, when considering the numbered channel contact circuits associated with the counting relays, how these counting relays are sequentially operated, with the one which is left operated at the end of the impulse transmission remaining in its operated position for selecting the indicated channel circuit.

A circuit is now closed for operating the No. 7 first digit relay 1D7, this circuit extending from (+), second lower make contact of relay SA, break contact of relay 1STP, inner lower break contact of relay CHO, conductor 81, break contact of relay 2TF, make contact of relay C6, make contact of relay C1, the No. 7 channel conductor, break contact of relay 1TF and winding of relay 1D7 to (−). Relay 1D7 closes a locking circuit for itself extending from (+) on the "stick 1" conductor, make contact and winding of relay 1D7 to (−).

A circuit is now closed for operating the counter release relay CRL extending from (+) on the "stick 1" conductor, make contact of relay 1D7, break contact of relay 1TF and winding of relay CRL to (−). The first transfer relay 1TF is now operated over a circuit extending from (+) on the "stick 1" conductor, make contact of relay 1D7, make contact of relay CRL and winding of relay 1TF to (−). Relay 1TF closes a locking circuit for itself which is independent of the make contact of relay CRL for holding relay 1TF operated after relay CRL is released, the release of CRL being effected by the operation of relay 1TF which opens up the winding of the CRL relay at its break contact of the continuity combination.

During the interval that relay CRL is operated, conductor "stick 1" is disconnected from the counting relays for effecting the release of the relays left operated in response to the first digit, in this example C6 and C1, after which the series circuit through the break contacts of relays C1 to C6, inclusive, is completed for extending the "stick 1" conductor to the winding of relay CX for operating this relay when relay CRL releases and closes its break contact. This prepares the counting relay circuit for the second digit. Since it has been assumed that No. 4 is the second digit and since it has already been explained how the counting relays operate and release, leaving counting relay C4 only operated at the end of four impulses, it will now be explained how the circuits function after the second digit is transmitted.

Recalling that relay CHO is operated at the beginning of the digit transmission and released at the end of the digit, a circuit is now closed for operating the No. 4 second digit relay 2D4 which extends from (+), second lower make contact of relay SA, break contact of relay 1STP, lower-most break contact of relay CHO, conductor 82, break contact of relay 2TF, break contact of relay C6, make contact of relay C4, make contact of relay 1D7 and upper winding of relay 2D4 to (−). Relay 2D4 closes a locking circuit for itself extending from (+), lower-most make contact of relay SAP, conductor 74, make contact and winding of relay 2D4 to (−). The operation of relay 2D4 closes a circuit for again operating relay CRL, this circuit extending from (+) on the "stick 1" conductor, make contact of relay 2D4, break contact of relay 2TF and winding of relay CRL to (−). Relay CRL closes a circuit for operating the second transfer relay 2TF which extends from (+) now applied to the winding of relay CRL, break contact of relay 2TF, make contact of relay 1TF, make contact of relay CRL and winding of relay 2TF to (−). Relay 2TF closes a locking circuit for itself extending from (+) on the "stick 1" conductor, make contact of relay 2D4, make contact and winding of relay 2TF to (−). The operation of relay 2TF opens up and releases relay CRL. During the interval when relay CRL is operated, counting relay C4 is released and when relay CRL is released, relay CX is again operated to prepare the counting relay circuit for the next digit.

Since the dialing of No. 74 for the first two digits identifies this as a local call to be completed in suboffice A, it now becomes necessary to clear out the main office trunk circuit so that this trunk may be used for some other connection. This is accomplished by relay 2D4 opening up the above described closed circuit across conductors 12 and 13, including contact 69 of relay CB and the windings of IMP and POL. Since conductors 12 and 13 are extended through the selector connector and the TT and RT conductors to the inter-office trunk circuit, by way of make contacts of relay SW of the incoming selector, the opening up of conductors 12 and 13 opens up the trunk circuit to office B for effecting the release of the switches in this office which were operated by the dialing of digits 7 and 4. The operation of relay 2D4 also effects the release of relays STK, TMC and UC1 of the first selector repeater and its associated selector connector. This is because relay 2D4 disconnects (+) (on conductor 74) from conductor 75 for opening up the locking circuit of relay STK and since the winding of relay STK is extended by way of conductor TMC STK to the locking circuit of relay TMC, this latter relay is released. Furthermore, the operation of relay 2D4 de-energizes conductor UMC STK for effecting the release of relay UC1. The release of relays TMC and UC1 of the selector connector opens up the trunk sleeve conductor ST, thus effecting the release of relay SW of the incoming selector for restoring the circuit of the incoming selector to normal. The two-way trunk used in connection with the dialing of the first two digits of this connection is now restored to normal and placed into service for use on an incoming call from office B or for an outgoing call to office B.

The remaining impulses will now be transmitted only to the equipment in office A, the circuit operations of which will now be explained. When the calling party transmits the next series of impulses (6 or 8), the counting relay chain will function as previously described, with relay CHO being operated at the beginning of the series and released at the end of the series. Channel circuits CH6 and CH8, connected to the lower-most contacts of counting relays CX and C2, are tied together, consequently when relay CHO is released a circuit is closed for operating the connecting relay HC68 of the selector connector. This circuit may be traced from (+), second lower make contact of relay SA, break contact of relay 1STP, lower-most break contact of relay CHO, conductor 82, make contact of relay 2TF, make contact of relay C6, make contact of relay CX to channel conductor CH6 (or make contact of relay C2 to channel conductor CH8 if No. 8 is dialed for this digit), conductor HC68 and winding of relay HC68 to (−). Relay HC68 closes a locking circuit for itself extending from (+), lower-most make contact of relay SAP, winding of relay X, conductor 14, make contact and winding of relay HC68 to (−). As long as the circuit to the winding of relay HC68 by way of conductor HC68 is extended to (+), as previously described, relay X is short-circuited and does not operate.

The operation of relay HC68 closes a circuit for operating the connector marker relay associated with the first selector repeater used (in this example No. 16) extending from (+), lower-most make contact of relay SAP of the first selector repeater, break contact of relay LCO, break contact of relay BY, connector marker release conductor LORL, make contact of relay HC68, conductor 83, winding of relay CLO16, break contact of relay CLO16 and break contact of common lockout relay CLO to (−). Relay CLO16 is interlocked with corresponding connector marker relays of other selector repeaters and selectors to prevent the operation of more than one of these relays at any one time. This interlock circuit includes the winding of relay CLO which is operated in series with relay CLO16, when the latter relay switches its continuity contact for locking itself in its operated position. This effects the operation of relay CLO for disconnecting (−) from the common circuit leading to all of these connector marker relays to prevent energizing any one of these relays as long as relay CLO is operated.

Assuming that the first connector is idle, a circuit is now closed for operating relay 1ALG of the connector allotter, this circuit extending from (+), make contact or relay HC68, conductor 84, make contact of relay CLO16, conductor 34, break contact of relay GD of the connector alloter, break contact of relay 1AL and winding of relay 1ALG to (−). The operation of relay 1ALG (or any other ALG relay of the group) closes an obvious circuit for operating guard relay GD. The circuit of relay 1ALG is now transferred from its above described operating circuit to a locking circuit including the inner upper make contact of relay GD, break contact of relay 1AL, make contact and winding of relay 1ALG to (−).

Since the No. 1 connector has been marked for selection, it is now in order to operate the No. 1 units connecting relay UC1 of the first selector repeater. The circuit for operating this relay may be traced from (+), uppermost make contact of relay CLO16, conductor 17, make contact of relay 1ALG of the connector allotter, conductor 64 and winding of relay UC1 to (−).

A circuit is now closed for operating link cutoff relay LCO of the first selector repeater, this circuit extending from (+) connected to the right hand terminal of the winding of relay UC1, make contact of relay UC1, conductor UMC STK, make contact of relay 2D4, conductor 85 and winding of relay LCO to (−). Relay LCO closes a locking circuit for itself from (+), lower-most make contact of relay SAP, make contact and winding of relay LCO to (−).

With relays LCO, HC68 and UC1 of the first selector repeater operated, the calling line is extended through to the selected connector by way of the calling line circuit extended to conductors LT and LR of the first selector repeater (as previously explained), make contacts of the continuity spring combinations of relay LCO, conductors 12 and 13, make contacts of relay UC1 of the selector connector, make contacts of relay HC68, conductors TC and RC, break contacts of the continuity spring combinations of relay AB of the connector and windings of relay CB to (+) and (−). This operates relay CB of the connector which in turn closes an obvious circuit for operating relay SA and this relay closes an obvious circuit for operating relay SAP.

The operation of relay SA of the connector applies (+) potential to the connector sleeve conductor SC for maintaining this potential on conductor 14 for keeping the locking circuit of relay HC68 energized and for maintaining relay LCO locked operated, as well as extending this (+) back over sleeve conductor LS of the first selector repeater and conductor FS of the finder for maintaining the line circuit CO and LO relays in their operated positions. This circuit may be traced from the break contact of relay RC of the connector and make contact of relay SA to conductor SC. This locking path by way of conductor 14, connected to the right hand terminal of the winding of relay LCO, is extended over conductor 85, make contact of relay 2D4 and conductor UMC STK to the lower make contact and winding of relay UC1 for locking this latter relay in its operated position.

The operation of relay LCO of the first selector repeater opens up conductors LORL and 83 which is effective to release relays CLO16 and CLO of the connector marker. The release of relay CLO16 opens up conductor 34 leading to the connector allotter for releasing relay 1ALG and this relay in turn opens up and releases relay GD. Relay 1AL of the connector allotter is operated over a circuit extending from (+), make contact of relay SAP of the connector, allotter conductor 1ALG and lower winding of relay 1AL of the connector allotter to (−). Relay 1AL is locked operated by way of its upper winding until the last connector No. 11 of the group is used for operating relay 11AL for in turn opening up the locking circuit for other AL relays of the group. This arrangement provides rotation of the connector selecting operations up to and including connector No. 11. Since relay 11AL operates to open up the locking circuits of all other AL relays, other connectors of the group will be assigned, when idle, by the release of their associated AL relays, this being effected by the de-energization of their lower windings by the release of the SAP relays and the de-energization of their upper windings by the de-energization of the common locking circuit at the break contact of relay 11AL. This means that connector No. 12 will not be allotted for use on regular calls as long as there is an idle connector of the first 11. Connector No. 12 will be allotted, however, when all other connectors of the group are in use. It will be later explained how a call from the test desk may select connector No. 12, when idle, even though there are other connectors available in the group, for testing purposes.

Referring back to the operation of relay LCO of the first selector repeater, the operation of the continuity contacts of this relay disconnects the calling line circuit from the windings of relay CB of the selector repeater for effecting the release of this relay. Relay LCO also disconnects (+) from the winding of relay SA for effecting the release of this relay, which in turn opens up and releases relay SAP. The release of relay SA also removes (+) from the "stick 1" conductor which is effective to release the counting relay or relays left operated. This de-energization of the "stick 1" conductor also de-energizes the locking circuits of relays 1D7, 1TF and 2TF for effecting the release of these relays. Relay 2D4 is not released because of the (+) applied to conductor 14 being extended back through the winding of relay X, conductor 74, make contact and lower winding of relay 2D4 to (—). This inserts relay X in this locking circuit of relay 2D4, when relay SAP releases to remove the (+) potential from the left hand terminal of the winding of relay X, thus operating this latter relay. Relay X maintains relay XP in its operated position after the release of relay SAP and relay XP maintains (+) potential on conductor AL for maintaining this selector repeater busy by keeping the 1AL relay of the finder allotter energized. Relay XP also maintains (+) potential on conductor STK for maintaining the locking circuit of the finder relays energized.

If all of the connectors are busy when 6 or 8 is dialed, the No. 1 stop relay 1STP and the busy relay BY of the first selector repeater are operated and the allotter relays and the units connecting relay UC1 are not operated as above described. When all connectors are busy, all of the AL relays of the connector allotter will be operated, consequently when relay CLO16 of the connector marker is operated for connecting (+) potential to conductor 34, as above explained, this (+) is extended through a break contact of relay GD of the connector allotter, make contacts in series of all of the AL relays, conductor 31, make contact of relay CLO16, connector busy conductor CBY, make contact of relay 2TF, conductor 86, upper winding of relay BY and lower winding of relay 1STP to (—). Relays BY and 1STP are operated, with relay BY being locked over a circuit extending from (+), lower-most make contact of relay SAP, break contact of relay LCO, make contact of relay BY, conductor 87, make contact of relay 2TF, conductor 86, upper winding of relay BY and lower winding of relay 1STP to (—). This circuit locks relays BY and 1STP in their operated positions until the connection is released for opening up the above described locking circuit by the release of relay SAP. Busy tone is connected to the calling line over a circuit extending from the busy tone source, make contact of relay 1STP, make contact of relay BY, condenser 80 and over the calling line circuit. Neither relay GD nor any ALG relay of the connector allotter is operated under this condition because of the above described series circuit being extended to conductor 31 instead of to the winding of an ALG relay. The operation of relay BY opens up conductor LORL for effecting the release of relay CLO16 of the connector marker and since this relay is locked up in series with common relay CLO, this latter relay is likewise released. Relay LCO of the first selector repeater is not operated because no UC relay is operated for extending (+) to conductor UMC STK, as was previously described in connection with a call to an idle connector. The UC relay (UC1 in the present example) is not operated under this condition because no ALG relay of the connector allotter is operated for connecting in these UC relays. Since relay LCO of the first selector repeater is not operated, the line circuit is not extended through to any connector, consequently the connector CB, SA and SAP relay operations above described are not effected. The CB, SA, SAP, counter relays, 1D7, 1TF and 2TF relays of the first selector repeater are not released in this class of call because the controlling relay CB is maintained operated over the calling line circuit because relay LCO does not operate to open up the windings of relay CB. The calling party hears the busy tone, hangs up and effects the release of relay CB, which in turn effects the release of the other relays of the first selector repeater in an obvious manner.

Referring to the connector circuit, it will now be explained how the dialing of the fourth or tens digit (in this example No. 2) effects the intermittent operation of relay CB for controlling the tens selection. The first release of relay CB of the connector closes a circuit for operating relay C1 of the connector counter, this circuit extending from (+), break contact of relay CB, make contact of relay SA, break contact of relay BY, conductor 88, break contact of relay TT, break contact of relay RI, conductor 26, make contact of relay CX and winding of relay C1 to (—). Relay CX was energized when relay SAP was operated for applying (+) by way of conductor 89, break contact of relay CRL, conductor 28 and break contacts in series of counting relays C0 to C1 inclusive, and winding of relay CX to (—). Since relay CHO is connected to conductor 26, the application of (+) to this conductor operates relay CHO at the beginning of the series of impulses and when relay CB remains energized at the end of the series, relay CHO is released, it being maintained in its operated position during impulse transmission because of its slow acting characteristics.

The release of relay CB at the beginning of the first impulse also closes a locking circuit for relay CX to prevent the release of this relay until the end of the impulse, this locking circuit extending from (+), lowermost make contact of relay SAP, break contact of relay CB, conductor 27, make contact and winding of relay CX to (—). When relay CB is energized at the end of the first impulse, this locking circuit for relay CX is opened at a break contact of relay CB for effecting the release of relay CX. When relay CB releases at the beginning of the second impulse, a circuit is closed for operating counting relay C2 which extends from (+), break contact of relay CB, make contact of relay SA, break contacts in series of relays BY, TT and RI, conductor 26, break contact of relay CX, make contact of relay C1 and winding of relay C2 to (—). When relay C1 was operated, it closed a locking circuit for itself from (+) on conductor 28 and when relay C2 operates this locking circuit is shifted from relay C1 to relay C2. Relay C1 is not released at this time, however, because of a second locking circuit extending through a break contact of relay CB to conductor 27 which may be traced through the break contact of relay CX and the make contact of relay C1 to the winding of this latter relay. When relay CB is energized at the end of the second impulse, this second locking circuit for relay C1 is opened and the latter relay is released.

When relay CHO is released at the end of this series of impulses, a circuit is closed for operating tens connecting relay TC2 which may be traced from (+), inner lower make contact of relay SAP, conductor STK, break contact of relay CHO, inner upper break contact of relay 1TF, even tens executing conductor XET, make contact of relay C2, conductor 91, and winding of relay TC2 to (—). It will be understood that this tens executing conductor is extended through contacts of the even numbered counting relays for selecting even numbered tens connecting relays of the line connector, only two of which (TC2 and TC0) are shown. Furthermore, when odd numbers are dialed for the first digit, this (+) is extended through the break contact of relay CHO and the middle upper break contact of relay 1TF to the odd executing tens conductor XOT for selectively operating the odd tens connector relays of the line connector in accordance with the number of the tens digit, which determines the counting relay which will be left operated at the end of this digit. The operation of relay TC2 closes a locking circuit for itself extending from (+), make contact of relay SAP, stick conductor STK, make contact and winding of relay TC2 to (—). It will be understood that a similar locking circuit is closed for any other TC relay of the line connector which may be selected and operated.

When the TC relay of the line connector is operated a circuit is closed for operating the counter release relay CRL of the connector extending from (+) on stick conductor STK, make contact of relay TC2, conductor 51, break contact of relay 1TF and winding of relay CRL to (—). The operation of relay CRL extends this (+) on conductor 51 to the winding of relay 1TF for operating this relay, which in turn locks itself at its continuity contact independent of the make contact of relay CRL. The operation of relay 1TF opens up and releases relay CRL. During the interval that relay CRL is operated, conductor 28 is opened for releasing the counting relay left operated and when relay CRL is released, conductor 28 is again connected to (+) potential for operating relay CX, as above described, to prepare the connector counter for the units digit.

It has been assumed that No. 1 is the units digit, consequently the release of relay CB in response to the transmission of this impulse from the dial again closes the above described operating circuit for relay C1 and the locking circuit for relay CX, as well as the operating circuit for relay CHO. When relay CB operates at the end of this impulse, the locking circuit for relay CX is opened and this relay is released. Since relay CB remains energized for a comparatively long interval, relay CHO is released for executing the units digit in accordance with the counting relay left operated in response to this digit.

A circuit is now closed for operating units connecting relay UC1 of the line connector extending from (+), inner lower make contact of relay SAP, conductor STK, break contact of relay CHO, make contact of relay 1TF, break contact of relay 2TF, odd units executing conductor XOU, make contact of counting relay C1, conductor 92 and winding of relay UC1 to (—). A locking circuit is closed for relay UC1 extending from (+) on stick conductor STK, make contact and winding of relay UC1 to (—). The operation of relay UC1 (or any other UC relay of the group) extends the (+) on conductor STK back over conductor 52 and break contact of second transfer relay 2TF to the winding of relay CRL for operating this relay. Relay CRL extends this circuit from (+) on conductor 52 by way of its make contact and a make contact of relay 1TF to the winding of relay 2TF for operating this latter relay. Relay 2TF, at its continuity make contact, locks itself in its operated position to (+) on conductor 52. The operation of relay 2TF opens up and releases relay CRL. While relay CRL is operated, conductor 28 is opened for releasing the counting relay left operated (in this example relay C1) and when relay CRL is released, (+) is again applied to conductor 28 for again operating relay CX to prepare the connector counter for the next or station digit.

Between the dialing of the units and the station digits, a test is made of the called line to determine if it is idle or busy. If the called line is idle, busy relay BY of the connector is not operated, consequently, when relay 2TF operates, the cut off relay CO of the called line is operated over a circuit which may be traced from (+), upper make contact of relay SAP, break contact of relay BY, conductor 93, make contact of relay 2TF, conductor 53, make contacts in series of line connector relays UC1 and TC2 to the sleeve conductor S21 leading to the line circuit of the called line. By referring to the line circuit in the upper left hand portion of Fig. 2, it will be seen that (+) applied to the sleeve conductor corresponding to conductor CS leading to the No. 11 line circuit, is effective to operate the CO relay of the line circuit, after which the LO relay of the called line circuit is operated by way of its lower winding connected in multiple with the winding of the CO relay by the operation of this latter relay. The operation of relays CO and LO of the called line circuit removes the battery supply including the windings of the LR relay to prevent the operation of this relay. The (+) potential applied to the sleeve conductor of the called line by way of conductor 53 and make contacts of the UC and TC relays of the line connector also serves to make this line busy to other calls.

In the event that the called line is busy, the operation of the TC and UC relays extends the sleeve conductor of this line (to which (+) potential is connected when the line is busy) to conductor 53 and thence by way of the break contact of relay 2TF (before this relay has time to operate), make contact of relay 1TF, conductor 94 and winding of relay BY to (—). Relay BY operates and closes a locking circuit for itself extending from (+), upper make contact of relay SAP, make contact and winding of relay BY to (—). When relay 2TF is operated, the sleeve conductor of the called line, now connected to conductor 53, is opened at the upper break contact of relay 2TF and at the break contact of the continuity combination of relay BY, thus maintaining the sleeve conductor clear from any of the connector circuits and maintaining relay BY locked until the connection is released by the calling party. Reverting busy test relay RBT is operated when relay BY operates over a circuit extending from (+) or stick conductor STK, break contact of relay 2TF, conductor 95, make contact of relay BY and winding of relay RBT to (−). When relay 2TF operates, this circuit is opened and relay RBT is released. This operation of relay RBT is of no importance in connection with this type of call, its function being in connection with a reverting call which will later be described. Reverting call relay RC was operated when the connector was seized by way of a circuit extending from (+), upper make contact of relay SAP, inner upper break contact of relay RBT and lower winding of relay RC to (−). When relay RBT is operated as just described, the lower winding of RC is opened and this relay is maintained energized during this interval by way of a circuit extending from (+), upper make contact of relay SAP, upper winding of relay RC, make contact of relay RC, make contact of relay SA and connector sleeve conductor SC which extends back to the line circuit of the calling line, thus holding relay RC energized in series with the CO and LO relays of the calling line circuit during this momentary operation of RBT. Relay RC likewise controls no circuit operation during this class of call, its function being in connection with a reverting call.

Referring back to the operation of relay BY in connection with a call to a busy line, the busy tone is not applied to the calling line until the station digit is dialed. Assuming that the calling subscriber dials No. 1 for the station digit, the release of relay CB does not close the above described circuit for operating relays CHO and C1 because this circuit is open at the lower break contact of relay BY. However, the release of relay CB extends this circuit from (+) by way of a make contact of relay BY, break contact of relay RBT, conductor 96, make contact of relay 2TF, winding of ringing relay RI and resistor 4RS to (−). Relay RI operates and closes a locking circuit for itself extending from (+) on conductor STK, make contact and winding of relay RI and resistor 4RS to (−). Relay CX is not released when the station digit is dialed and the called line is busy, it being maintained energized by way of a circuit to (+) at the lowermost make contact of relay SAP, break contact of relay CRL, conductor 28 and break contacts in series of counting relays C0 to C1 to the winding of relay CX. This is because relay C1 is not operated for opening up this circuit of relay CX.

Relay TT is not operated in connection with a call to a busy line, consequently the ringing and talking circuits of the outgoing portion of the connector are not completed. Busy tone is connected to the calling line circuit from the busy tone source, make contact of relay BY, conductor 97, make contact of relay RI, conductor 98, condenser 99, break contact of relay AB and over the connector tip circuit TC to which the calling line is now connected. When the calling party hangs up, after hearing the busy tone, relays CB, SA and SAP are released. The disconnection of (+) from stick conductor STK by the release of relay SAP opens up and releases all of the operated relays of the connector and the line connector including relays CX, RI, BY, etc.

Assuming that the called line is idle, the operation of relay 2TF opens up the circuit of relay BY, which is not operated on this class of call, and applies (+) potential to the sleeve conductor of the called line for operating the cut-off and lockout relays of this line. This circuit may be traced from (+), make contact of relay SAP, break contact of relay BY, conductor 93, make contact of relay 2TF, conductor 53 and make contacts of relays UC1 and TC2 to sleeve conductor S21 of the called line. When the station digit is dialed, the release of relay CB closes the above described circuit for operating relays C1 and CHO and when relay CB operates at the end of this impulse, relays CX and CHO are released, with relay C1 being maintained energized. The operation of relay CHO closes a circuit for operating ringing relay RI extending from (+) on conductor STK, make contact of relay CHO, make contact of relay 2TF, winding relay RI and resistor 4RS to (−). Relay RI closes its above described locking circuit and connects reverting ringing tone to the calling line over a circuit extending from the reverting ringing tone source, break contact of relay BY, conductor 97, make contact of relay RI, conductor 98, condenser 99 and over the calling line circuit to the calling station. When relay CHO is released, a circuit is closed for operating test relay TT extending from (+) or conductor STK, break contact of relay CHO, make contact of relay 1TF, make contact of relay 2TF, make contact of relay RI, conductor 100, break contact of relay BY, conductor 101, and upper winding of relay TT to (−).

Relay TT closes a locking circuit for itself which includes the above described circuit to (+), but which now goes by way of a make contact of relay TT connected in multiple with the make contact of relay RI for maintaining relay TT operated after relay RI is released in response to the removal of the receiver at the called station.

Ringing current of the selected frequency is connected to the called line over a circuit extending from the 30 cycle source of ringing current, make contact of relay C1, conductor 57, break contact of relay CHO, winding of trip relay TR, break contact of reversing relay RV, make contact of relay RI, make contact of relay TT, conductor 56, make contacts of relays UC1 and TC2, lower side of the called line, called substation circuit, upper side of the called line, make contacts of relays TC2 and UC1, conductor 55, make contact of relay TT, make contact of relay RI and break contact of relay RV to (+). This ringing current applied to the called line from the 30 cycle source is interrupted in the well known manner and applied to the lower side of the called line. In the event that the station digit is 2, 3, 4 or 5, then 42 cycle, 54 cycle, 66 cycle or 16 cycle ringing current respectively would be selected by the connector counter relays for applying these different frequencies to the lower side of the called line over the above described circuit. In the event that the station digit is 6 to 0 inclusive, reversing relay RV is operated when counter relay C6 is energized over a circuit extending back by way of conductor 29, make contact of relay RI, break contact and winding of relay RV to (−). Relay RV closes a locking circuit for itself for maintaining this relay operated during this connection extending from (+) on conductor STK, make contact and winding of relay RV to (−). The operation of relay RV reverses the above described connection to the called line so that the selected ringing current is applied to the upper side of the line with the lower side returning to (+) at the make contact of relay RV. This provides five frequency divided circuit ringing on a full selective basis.

When the called party answers, trip relay TR is operated in the well known manner for short-circuiting and releasing relay RI, after which relay TR is released because the ringing circuit including the winding of this relay is opened by the release of relay RI. The called line is now connected by way of conductors 55 and 56, make contacts of relay TT and break contacts of relay RI to the battery supply including the windings of answering bridge relay AB. The closed circuit across the called line operates relay AB for reversing the battery supply to the calling line for supervisory or metering purposes. This establishes the talking connection, with talking battery being fed to the calling line through the windings of relay CB, to the called line through the windings of relay AB and with these two lines being connected in a conversational circuit by way of the talking condensers connected between relays CB and AB.

Release of the connection is controlled by the calling party. The hanging up of the receiver at the calling station opens up and releases relay CB for in turn releasing relays SA and SAP in sequence. The release of relay SA opens up the sleeve conductor SC for releasing the relays of the calling line circuit, the finder relays, as well as the LCO, HC and UC, X and XP relays of the first selector repeater, thus restoring the selector repeater, the line finder and the line circuits to normal. Relay SAP disconnects (+) potential from conductor 1ALC for de-energizing the lower winding of the connector allotter relay associated with this connector, for releasing this relay in the event it is not locked by way of its upper winding as previously described. The release of relay SAP, at its lower make contacts, disconnects (+) potential from the circuits of the other relays of the connector left operated as previously explained. This effects the release of all relays of the connector, thus restoring this circuit to normal for use on another call.

*Automatic marker transfer*

The above description includes the operation of the regular marker circuit shown in Fig. 2. The circuits are arranged for automatically transferring from this regular marker to the reserve marker in response to a failure in the circuit operation of the regular marker. This control is effected, for example, when one of the tens marker relays TLO or one of the units marker relays ULO operates and, due to a faulty circuit, fails to clear out and release the operated marker relay for clearing out this particular call and preparing the circuits for control by another call. The No. 1 tens control relay 1TCA is normally energized over a circuit extending from (+), winding of relay 1TCA, conductor 71, break contacts in series of all the No. 1 tens marker TLO relays and resistor 1RS to (−). This circuit maintains relay 1TCA energized as long as all the TLO relays are in their normally de-energized positions. A similar circuit for maintaining the units common relay 1UCA normally energized extends from (+), winding of relay 1UCA, conductors 72 and 73, and break contacts in series of all the 1ULO relays to (−) through resistor 2RS. Due to a failure of either a regular TLO or a regular ULO relay to clear out within a predetermined time after operation, either the associated 1TCA relay or the 1UCA relay will remain de-energized long enough to release either one or both of these relays for in turn releasing their repeater relay 1CAP. The release of relay 1CAP extends (+) through its break contact and the break contact of the 1TCA relay and/or relay 1UCA to the corresponding lamp for lighting this lamp to indicate which one of the lockout circuits is in trouble.

The release of relay 1CAP also closes a circuit for energizing the slow acting dash-pot relay, this circuit extending from (+), break contact of relay 1CAP, conductor 102, break contact of "all trunks busy" relay ATB and winding of the dash-pot relay to (−). The dash-pot relay takes a comparatively long interval of time to operate its make contact to allow for normal operation and release of the marker relays. If some one of these relays fails in its operation then the above described circuit to the dash-pot relay is maintained for a sufficiently long interval of time for it to close its make contact which applies (+) by way of conductor 103, lower middle break contact of relay 1CAP, conductor 11, break contact and winding of switching relay SW and winding of minor alarm relay MNA to (−). Relay SW operates and closes a locking circuit for itself at its continuity contact for maintaining this relay in its operated position until released by the manual operation of the release key, which in turn opens up the locking circuit. As long as relay SW is energized, relay MNA is energized in series therewith for closing its make contact which may be used in any well known circuit for controlling the transmission and indication of a minor alarm signal.

The operation of relay SW switches all of the common tens and units digit marking wires from the No. 1 TLO relays of the regular marker to the No. 2 TLO relays of the reserve marker. Relay SW also applies (+) by way of conductor 1CAP to the winding of relay 1CAP for maintaining this latter relay energized to prevent any hunting operation or switching back and forth between the marker circuits. The manual transfer key is used for manually transferring from the regular to the reserve marker, the operation of this key closing an obvious circuit for operating relays SW and MNA and for locking these relays in the previously described manner. Relay SW also switches the (+) potential circuits for operating the tens and units finder relays in accordance with the tens and units marker relays operated from the regular to the reserve marker.

After the transfer has been made, the reserve marker functions in the same manner as the regular marker described above in connection with the normal operation of the system. In the event of a failure of the reserve marker, either relay 2TCA or relay 2UCA will be released since these relays are connected in the reserve marker circuit in the same manner as relays 1TCA and 1UCA are connected to the regular marker circuit. The release of either the 2TCA or 2UCA relays open up and releases the repeating relay 2CAP, this latter relay closing similar circuits as relay 1CAP to indicator lamps as selected by the 2TCA and the 2UCA relays. The release of relay 2CAP applies (+) potential through a break contact of major alarm relay MA and break contact of relay ATB to the winding of the dash-pot relay. The dash-pot relay is operated, as above explained, it measures off the pre-determined time interval and then closes a circuit from (+), conductor 103 and a break contact of relay 2CAP for operating relays MA and MJA in series. Relays MA and MJA are locked operated over a circuit extending from (+), break contact of relay 2CAP, make contact of relay MA and windings of relays MA and MJA in series to (—). Relay MJA closes any well known major alarm circuit for transmitting and indicating such a major trouble condition.

Relay MA opens up the circuit of the dash-pot relay to prevent the energization of this relay during a major alarm condition, thus reducing current drain and the hazard of overheating this relay. In the event that the trouble condition of the reserve marker clears up and the No. 2UCA or No. 2TCA and the 2CAP relays are again energized, then relays MA and MJA are released, the major alarm circuit is opened and the reserve marker is maintained in operative connection with the line circuits. It will be understood that the transmission of a minor alarm condition to a remote office indicates to the attendant that there is a case of trouble in the unattended suboffice which is not of major importance but which should be cleared up at the earliest convenience. Furthermore, the indication in the remote office of a major alarm condition is of such importance that the attendant will make all necessary efforts to dispatch a trouble man to the remote office at once.

*Reverting call*

When a calling party dials a reverting call, the line number of the called party is the same as that of the calling party, with the station digit being different. In a call of this class, the circuits function in exactly the same manner as described in connection with a regular call, assuming that the number dialed is 746112 from a station whose number is 746111. The line finder finds the calling line, the first selector repeater responds to the first two digits 74 and at the same time the switches in office B respond to these first two digits, after which the trunk is opened up and released because this is a call for a station back in the originating suboffice A. When digit 6 is dialed, the selector repeater is driven to the sixth level for selecting an idle connector, after which this connector responds to the tens and units digits 11 for selecting the calling line, all in the manner previously described.

Figure 13:
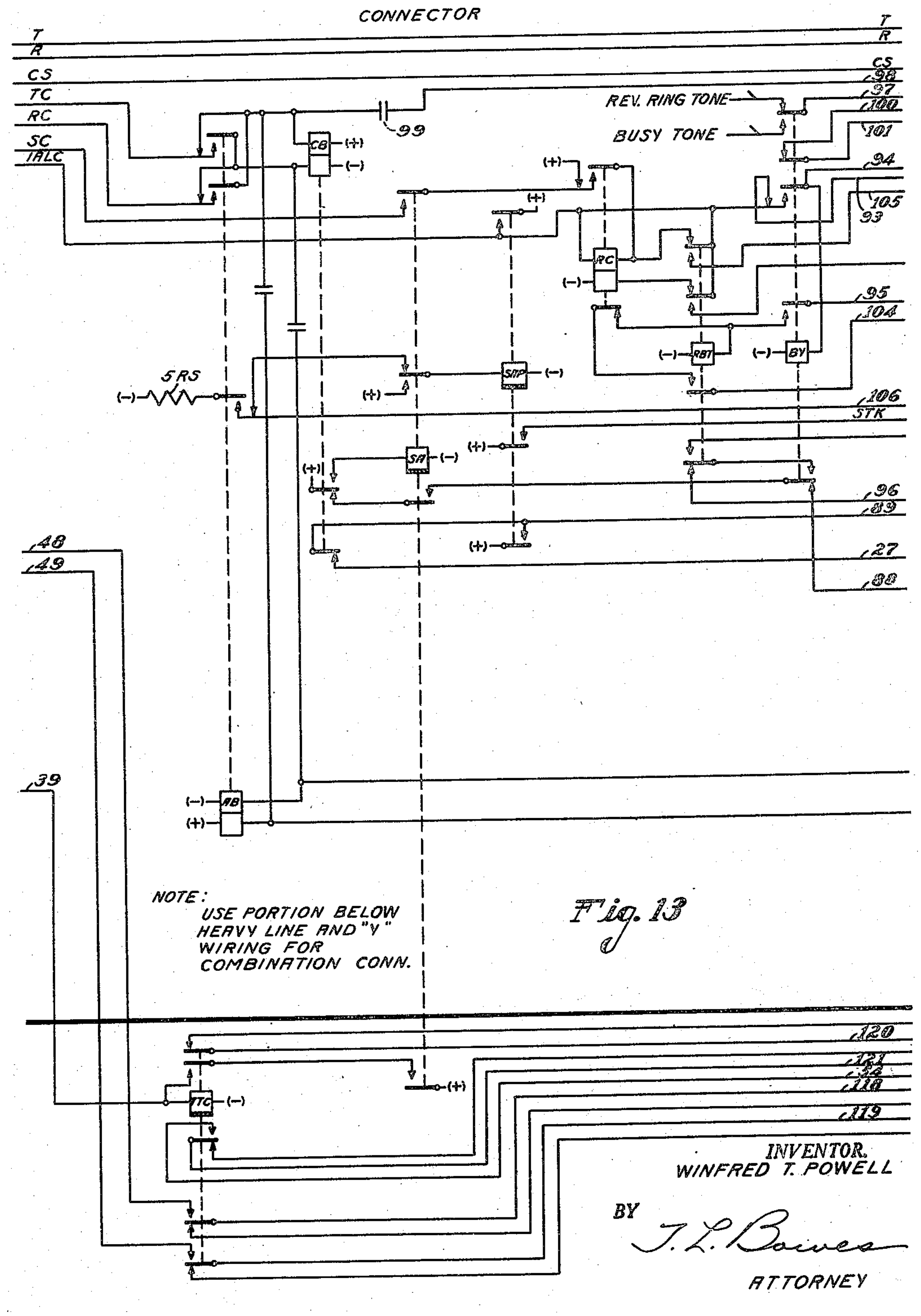

Referring to the connector circuit of Fig. 13, relay BY is operated after the units digit is dialed because the sleeve conductor of the called line is connected to (+), since this sleeve conductor is the sleeve conductor of the calling line. The operation of relay BY closes the previously described circuit for operating relay RBT during the interval between the operation of BY and the operation of slow operate relay 2TF. Relay RBT opens up both windings of relay RC, the lower winding being opened at the inner upper break contact of relay RBT and the upper winding being opened at the outer upper break contact of relay RBT. It will be recalled that relay RC was maintained energized over its upper winding during the operation of relay RBT in connection with a regular call. In connection with a reverting call, however, the opening up of the outer upper break contact of relay RBT effects the release of relay RC because (+) potential is applied to the left hand terminal of its upper winding at a make contact of relay SAP and (+) potential is applied to the right hand terminal of this upper winding (since the calling line is the same as the called line) over a circuit extending from this right hand terminal, upper make contact of relay RC, make contact of relay SA, sleeve conductor SC leading back to the calling line by way of conductor 14 of the first selector repeater used on this call, winding of relay X of the first selector repeater, make contact of relay LCO, link sleeve conductor LS, make contacts of the UF and TF relays of the line finder, finder sleeve conductor FS, break contact of line relay LR of the calling line circuit (which is the called line circuit), connector sleeve conductor CS extending to the connector multiple, make contacts of relays TC1 and UC1 of the line connector, conductor 53, break contact of relay 2TF, make contact of relay 1TF, conductor 94, make contact of relay BY and make contact of relay SAP to (+), thus short-circuiting the upper winding of relay RC for effecting the release of this relay. When relay 2TF is operated, there is a locking circuit provided for relay RBT extending from (+), inner lower make contact of relay SAP, conductor STK, make contact of relay 2TF, conductor 104, make contact of relay RBT, break contact of relay RC and winding of relay RBT to (—), thus maintaining both windings of relay RC de-energized and preventing the operation of this relay during the remaining portion of this connection. It will thus be seen that relays BY and RBT will be operated and relay RC will be released when the units digit is dialed in connection with a reverting call.

When the station digit is dialed, relay RI is operated as previously described and, since relay BY is locked operated, the calling party will hear the busy signal. The instructions are for the calling party to hang up the receiver and wait a few seconds for ringing to be effected and then to remove the receiver to establish the talking connection with the called party. When the calling party hangs up, relay CB and SA are released, but relay SAP is maintained operated over a circuit extending from (+), upper make contact of relay SAP, make contact of relay RBT, conductor 105, lower winding of relay TT, conductor 106, break contact of relay AB break contact of relay SA and winding of relay SAP to (—). This circuit operates relay TT and holds relay SAP operated. Relay TT, at its second lower break contact opens up the impulsing circuit to prevent any further operation of relay CB from transmitting impulses to the counting and CHO relay circuits.

The ringing circuit is now closed by way of the lower-most make contact of the counting relay operated in response to the station digit (in this example C2), conductor 58, break contact of relay CHO, winding of relay TR, break contact of relay RV, make contact of relay RI, make contact of relay TT, conductor 56, make contacts of the UC and TC relays of the line connector, tip side of the line circuit, substation circuit, ring side of the line circuit, make contacts of the TC and UC relays of the line connector, conductor 55, make contact of relay TT, make contact of relay RI and break contact of relay RV to (+). This rings the called station and when either the calling or the called party removes the receiver, trip relay TR operates to short-circuit and release ringing relay RI, after which answering bridge relay AB is operated over the line circuit. The operation of relay AB opens up and releases relay SAP. At the continuity make contact of relay AB, (—) through resistor 5RS is applied to the lower winding of relay TT for maintaining this relay in its operated position until relay SAP has time to release.

The release of relay SA when the calling party hangs up, effects the release of the first selector repeater and the line finder, as previously described. The LO and CO relays of the line circuit are maintained energized until relay SAP is released by means of the (+) which is applied to the sleeve conductor of the line circuit by way of conductor 53 and make contacts of relays RBT and SAP. When relay SAP releases, (+) is removed from conductor 53 for releasing relay LO of the line circuit. Relay CO is slow to release and when relay LO is released, the closed circuit across the line is effective to again operate relay LR for closing a circuit for holding relay CO, this circuit extending from (+), inner lower make contact of relay LR, inner upper make contact of relay CO, upper winding of relay LO and winding of relay CO to (−). This circuit is extended from a point between the windings of relay LO and CO by way of the lower make contact of relay CO to the lower winding of relay LO for energizing this winding of the LO relay. Since the windings of the LO relay are differentially connected, this latter relay is not operated at this time. Talking battery for the connection is fed through the windings of relay LR and (+) potential is applied to the connector sleeve CS of this line circuit to maintain the line busy to other calls. With relay CO operated and with relay LO released, the connections to the common marker wires are maintained open. When both parties hang up their receivers relay LR is released to restore the circuit to normal.

*Incoming trunk call*

Figure 11:
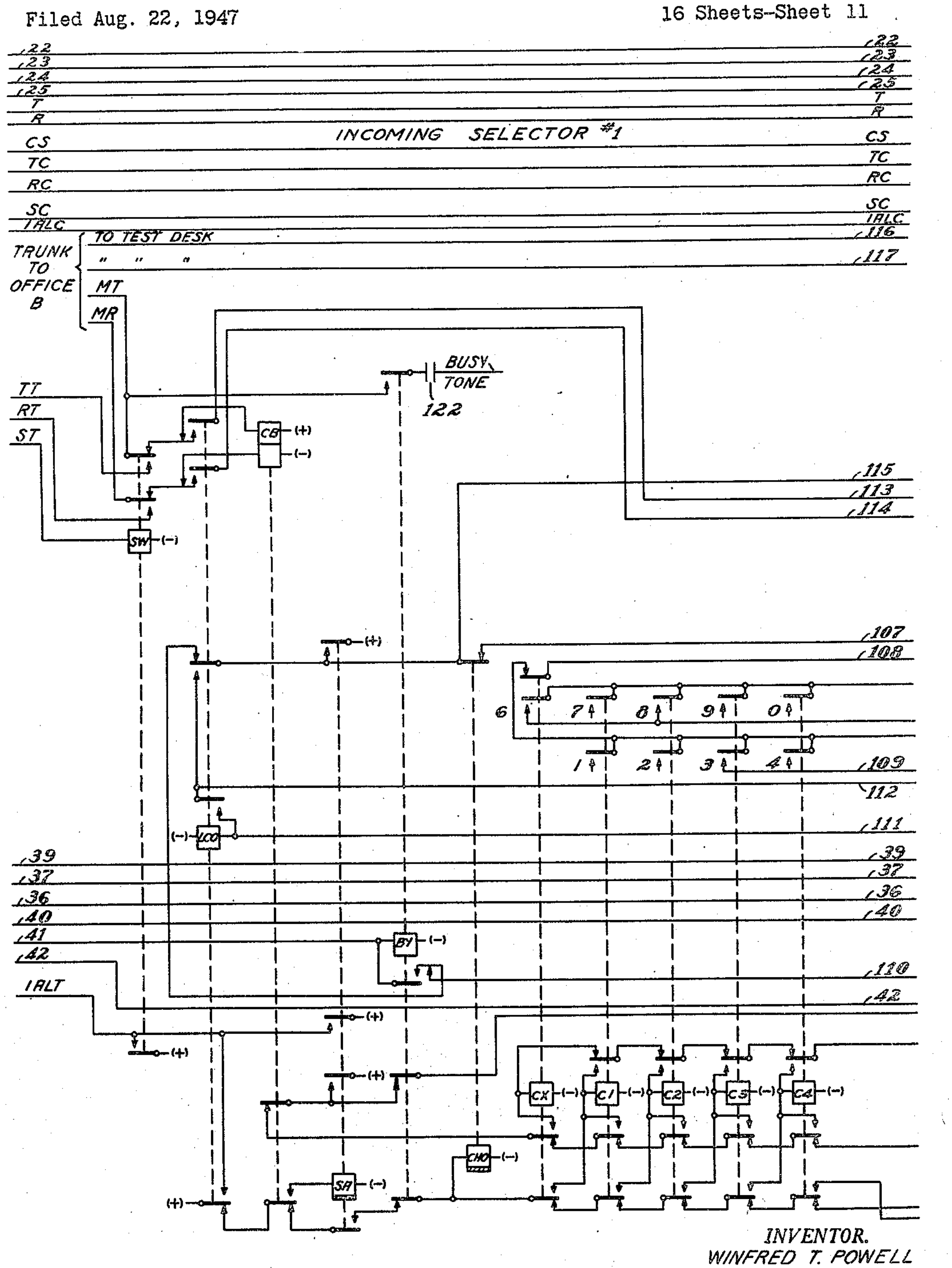
Figure 12:
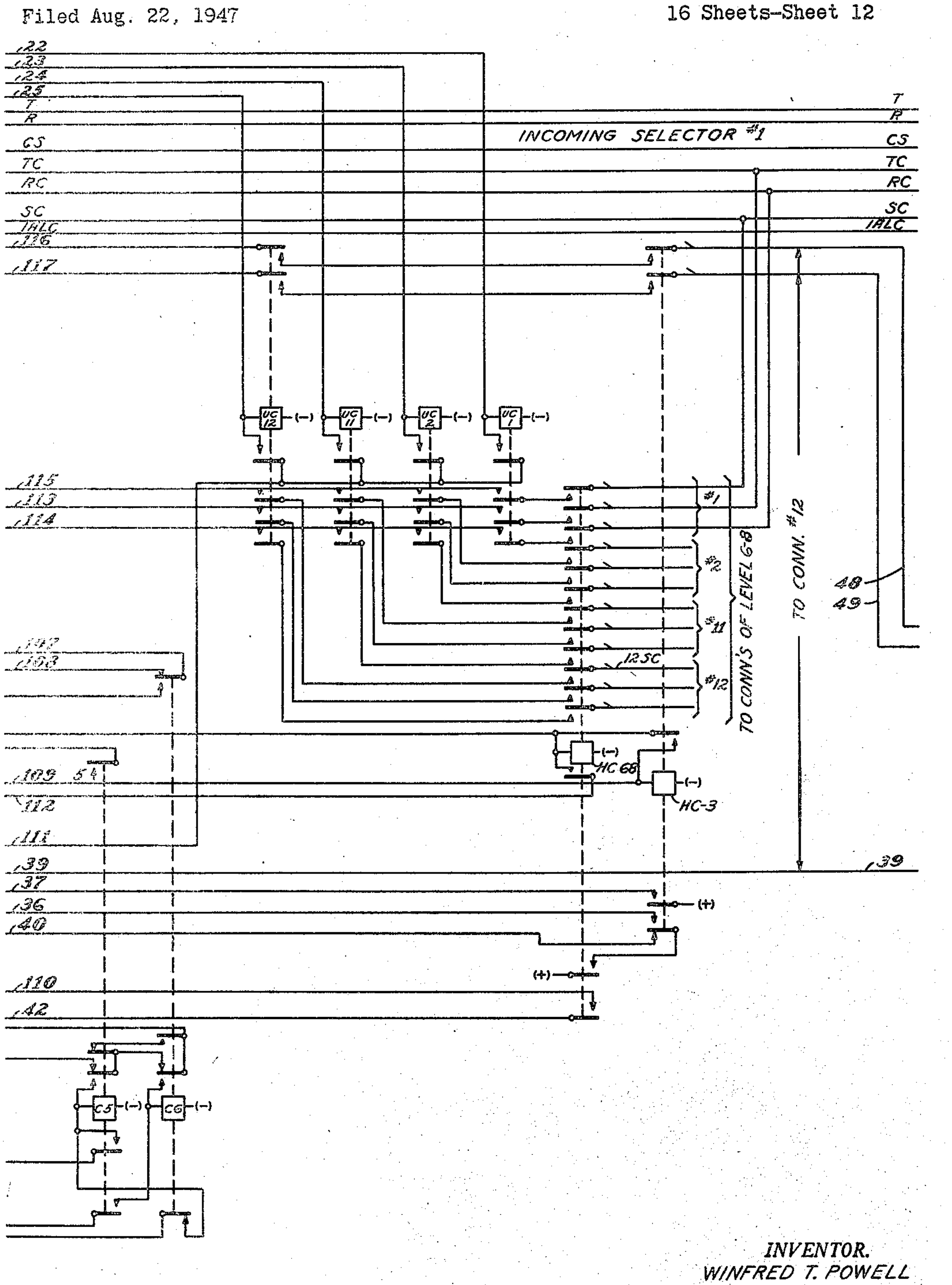

Since the two-way trunk circuits between the A and B offices are connected to the outgoing terminals of the first selector repeaters and to the incoming terminals of the incoming selectors in office A, it will be obvious that relays CB and SA of the incoming selector of Fig. 11 will be operated when this incoming selector is selected in office B. It has already been explained how these relays of the incoming selector are disconnected on an outgoing call from office A to office B.

Assuming the incoming selector associated with one of the two-way trunks to be selected on a call from office B to office A and that this incoming selector is the one illustrated in Fig. 11, the closed circuit across the MT and MR trunk conductors effects the operation of relay CB for closing an abvious circuit for operating relay SA. Relay SA applies (+) potential to the allotter conductor 1ALT for operating the 1AL relay of the trunk allotter to mark this trunk busy to outgoing calls. Since the impulse operations for operating the counting relays of the incoming selector and the operations for selecting and operating the HC and UC relays, as well as the operation of busy relay BY when all connectors are busy, are the same as described in connection with the first selector repeater, it is not believed necessary to describe in detail the operation of the incoming selector. It will be obvious that the impulse repeating relays for an incoming call to office A are in the repeater associated with the trunk in office B and, since the operation of the incoming selector forms no part of the present invention, the particular one shown in Figs. 11 and 12 being for illustrative purposes only, no further description will be provided in connection with the operation of this circuit element.

*Test clerk call*

The circuits are arranged so that the test clerk in office B may select the combination connector in office A for testing purposes, when this connector is not in use on a regular service call. To describe the operation of this part of the system, it will be assumed that the test clerk selects one of the two-way trunks leading to office A and operates the incoming selector associated with this trunk by dialing three impulses for selecting the combination connector. The three impulses transmitted over the trunk are repeated by relay CB of the incoming selector, during which time relay SA remains in its operated position because of its slow acting characteristics, relay CHO is operated at the beginning of the impulse transmission and is released at the end of the series of impulses. The counting relays of the incoming selector are operated in a manner exactly the same as those of the first selector repeater, previously described.

The counting relay C3 is left in its operated position at the end of the transmission of the three impulses and when relay CHO is released a circuit is closed for operating relay HC3 extending from (+), upper-most make contact of relay SA, break contact of relay CHO, conductor 107, break contact of relay C6, conductor 108, break contact of relay CX, make contact of relay C3, conductor 109 and winding of relay HC3 to (−). Relay HC3 extends its operating circuit to the winding relay HC68 for operating this latter relay, after which the (+) potential applied to the windings of relays HC3 and HC68 is extended back to make contacts of relay LCO for a purpose which will later be explained. A circuit is now closed for operating the connector marker relay associated with the selector used, relay CLO1 in the present example, extending from (+), upper-most make contact of relay SA, break contact of relay LCO, break contact of relay BY, conductor 110, make contact of relay HC68, conductor 42, winding of relay CLO1, break contact of relay CLO1 and break contact of common lockout relay CLO to (−). The operation of relay CLO1 transfers its winding from the circuit leading directly to (−) at a break contact of relay CLO, to (−) by way of the winding of relay CLO for operating this latter relay and for locking relay CLO1.

A circuit is now closed for operating relay 12ALG of the connector allotter which may be traced from (+), make contact of relay HC68, make contact of relay HC3, conductor 36, make contact of relay CLO1 of the connector marker, conductor 35, break contact of relay GD of the connector allotter, break contact of relay 12AL, and winding of relay 12ALG to (−). It will be understood that the operation of relays CLO1 and CLO of the connector marker effects the locking out of all other relays of the connector marker to prevent the operation of any one of these relays by another call during the time that the operated relay of the marker used in connection with the present call is functioning.

The operation of relay 12ALG of the connector allotter closes an obvious circuit for operating relay GD, which in turn transfers the operating circuit of relay 12AG from the break to the make contact of relay GD and thence by way of a break contact of relay 12AL and a make contact of relay 12ALG to the winding of this latter relay. A circuit is now closed for operating the proper UC relay of the incoming selector for connecting to connector No. 12 (in this example relay UC12), which extends from (+), upper-most make contact of relay CLO1 of the connector marker, conductor 15, upper-most make contact of relay 12ALG of the connector allotter, conductor 25 and winding of relay UC12 to (−). A circuit is also closed for operating connector test relay TTC of the No. 12 connector which may be traced from (+), make contact of relay HC3, conductor 37, make contact of relay CLO1, conductor 38, make contact of relay 12ALG, conductor 39 and winding of relay TTC to (−).

Figure 14:
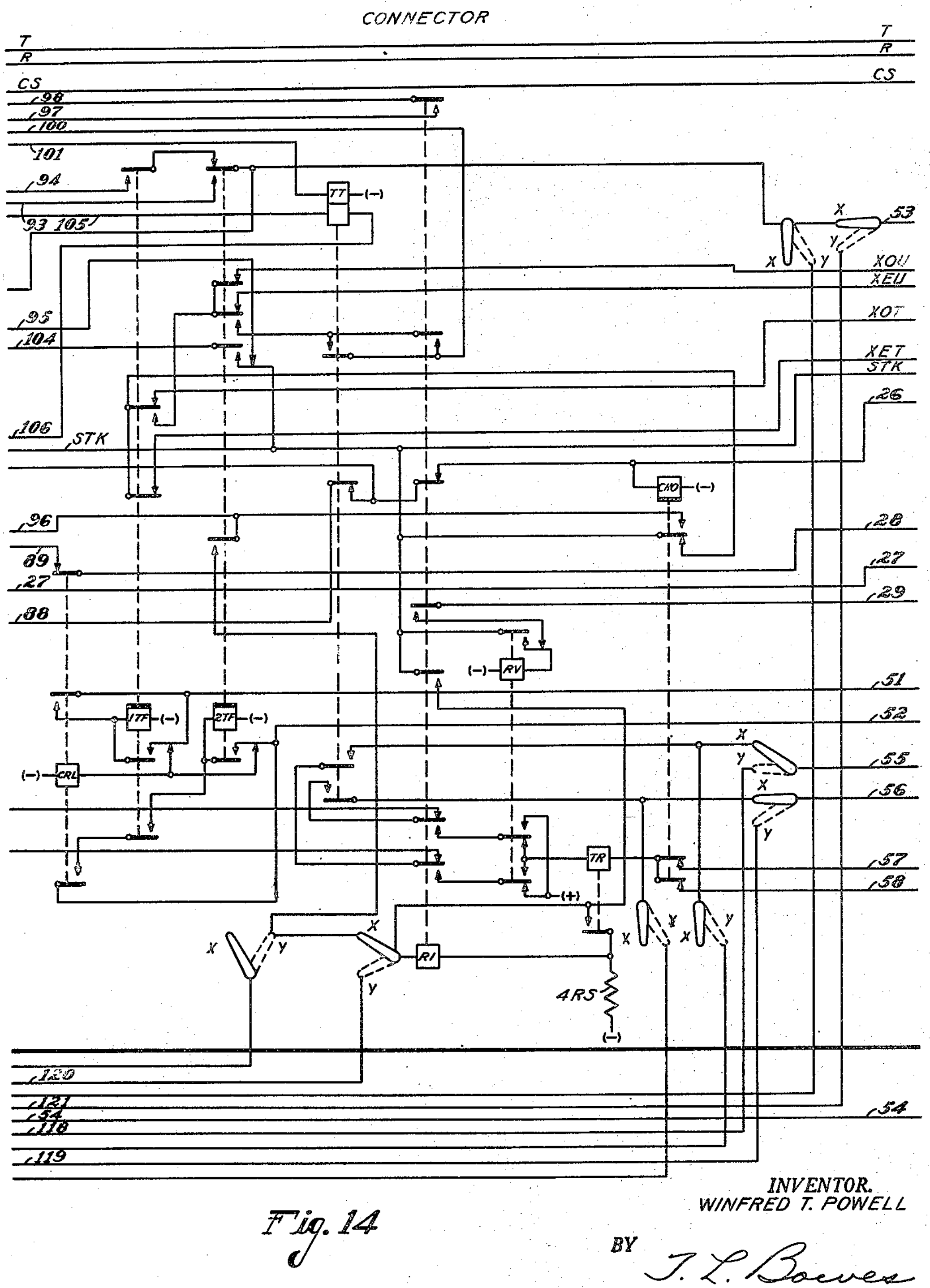
Figure 15:
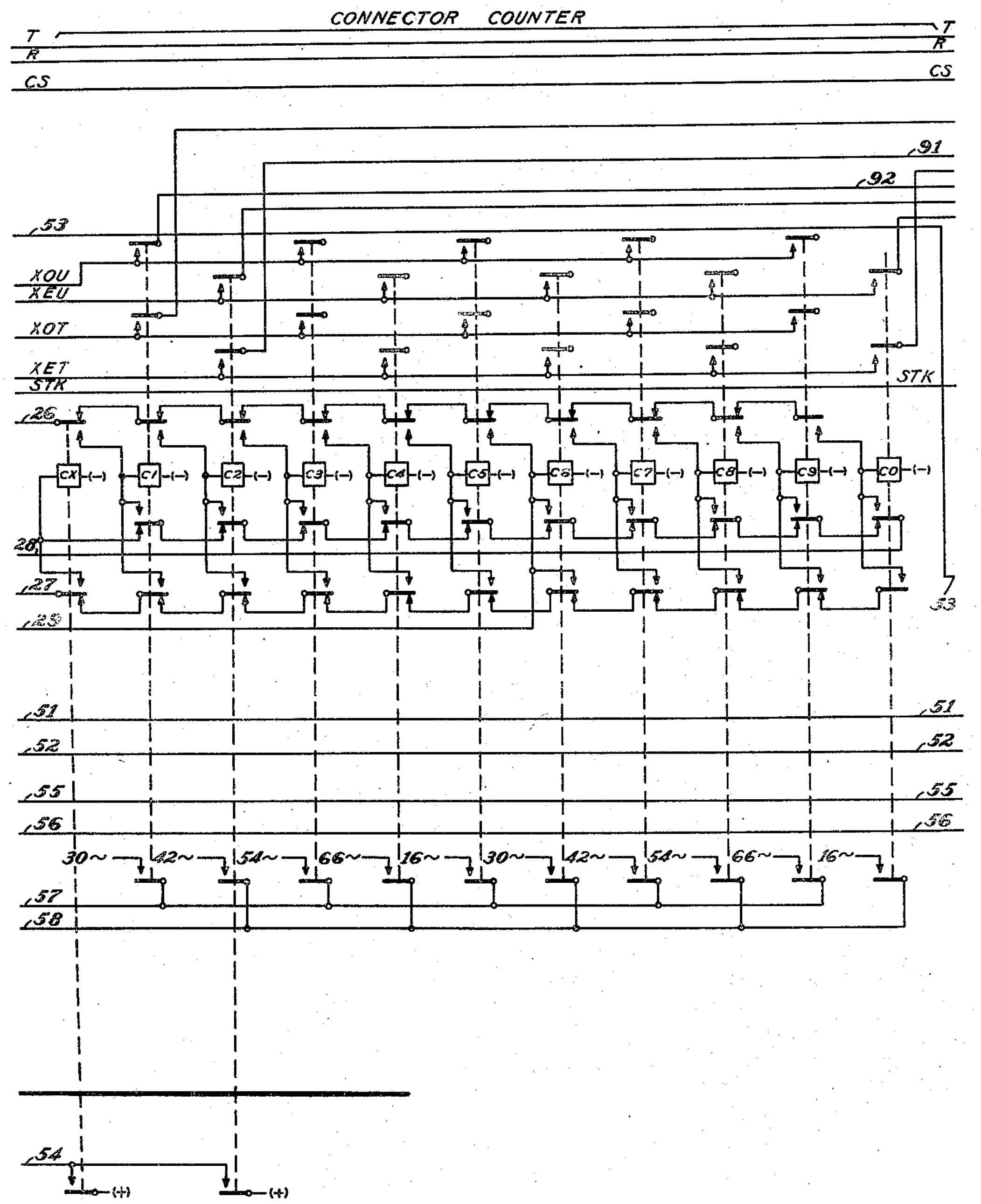
Figure 16:
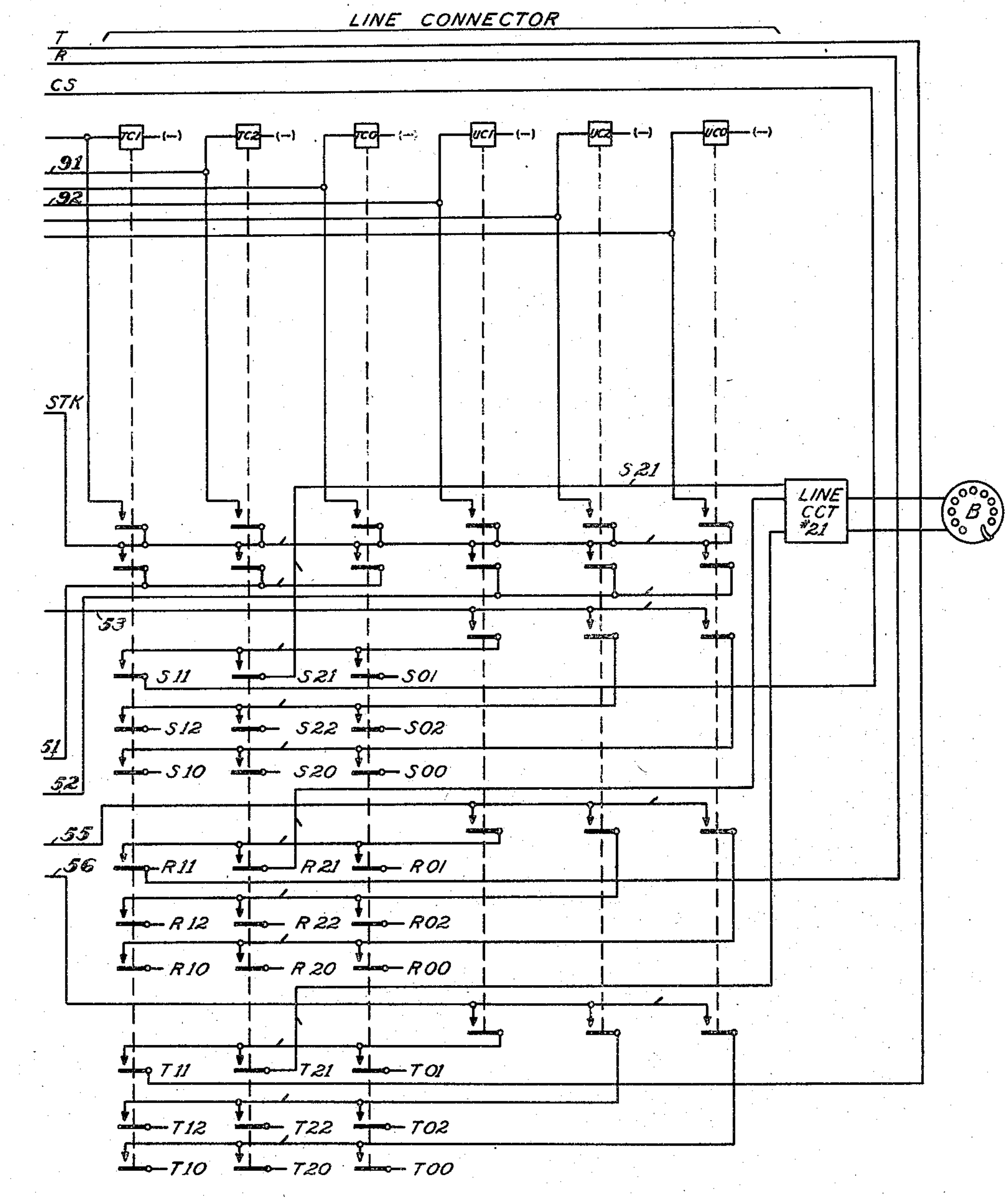

At this point it will be pointed out that the No. 12 combination connector circuits are exactly the same as for the regular connector except that the combination connector has the TTC relay and the circuit connections shown below the heavy line of Figs. 13, 14 and 15 added. Furthermore, the Y connections shown above the heavy line of Fig. 14 are used instead of the X connections for the combination connector circuit. With this explanation, the operation of the combination connector will be continued.

Link cutoff relay LCO of the incoming selector is now operated over a circuit extending from (+) applied to the left hand terminal of relay UC12 (this circuit having been previously described), make contact of relay UC12, conductor 111 and winding of relay LCO to (−). Relay LCO closes a locking circuit for itself extending from (+), upper-most make contact of relay SA, make contacts in series and winding of relay LCO to (−). The operation of relay LCO extends this locking circuit by way of conductor 112 to the locking circuits of relays HC68 and HC3 for maintaining these two relays locked until relay SA of the incoming selector is released, after which these relays will be locked over other circuits as will be described.

The operation of relay LCO opens up the above described circuit including conductors 42 and 110 which is effective to release relays CLO1 and CLO of the connector marker, thus placing this marker in condition for use by another call. The operation of relay LCO of the incoming selector, at its continuity contacts, disconnects the incoming trunk conductors from the windings of relay CB thus effecting the release of this relay, it in turn opens up and releases relay SA for in turn releasing the counting relay left operated. Relay LCO transfers the trunk conductors to connector No. 12 by way of conductors 113 and 114 and make contacts of relays UC12 and HC68 of the incoming selector for operating relay CB of the No. 12 connector. Relay CB effects the operations of relays SA and SAP in the previously described manner. Relay SA of the connector closes an obvious circuit for locking relay TTC.

Relay SAP of the connector applies (+) potential to allotter conductor 12ALC (not shown but which corresponds to conductor 1ALC of the connector shown in Fig. 13) for operating relay 12AL of the connector allotter, this relay in turn opening up and releasing relays 12ALG and GD. Relay 12AL of the connector allotter is only locked operated as long as relay GD is operated for extending (+) potential to the locking circuit of relay 12AL including its upper winding. Consequently, relay 12AL will be released when the connection using connector No. 12 is released, thus rendering connector No. 12 available for selection from the test desk at any time that it is not in use.

The operation of relay SA of the No. 12 connector extends (+) from the break contact of its RC relay back over sleeve conductor 12SC, through make contacts of relays HC68 and UC12 and conductor 115 to the locking circuit of relay LCO for locking this relay in its operated position after relay SA of the incoming selector is released. This locking circuit is also extended to relays HC68 and HC3 by way of conductor 112 for locking these relays operated from the selected connector, before the locking circuit for these relays provided by relay SA of the incoming selector is disconnected.

Since relays HC3 and HC68 of the incoming selector are operated on this class of call, the test conductors 116 and 117 leading to the test desk in the distant office are extended through make contacts of relays UC12 and HC3 to conductors 48 and 49 leading to make contacts of relay TTC of the combination connector. Since relay TTC is operated, these test conductors are extended by way of conductors 118 and 119 and the Y connections of the connector circuit to conductors 55 and 56, these conductors being disconnected from contacts of the TT relay by the operation of the TTC relay. Conductors 55 and 56 are extended through contacts of the line connector relays to the line conductors of the called line and since these line conductors are not connected to the contacts of the TT relay, they are maintained clear of any battery or ringing current connections. Furthermore, relays RI and TT of the connector are not operated on a test call because the Y connection from the RI relay, including conductor 120, is opened at a break contact of relay TTC and, since relay RI cannot operate, the circuit for relay TT is not completed. The cutoff and lockout relays of the called line are operated, however, over a circuit extending from the sleeve conductor of this line, through make contacts of the TC and UC relays, conductor 53, Y connection shown in the upper right hand portion of Fig. 14, conductor 121, make contact of relay TTC, conductor 54 and make contact of relay CX, it being understood that relay CX of the connector counter is operated after the units digit is dialed for selecting the line, as previously explained. The operation of the cutoff and lockout relays of the called line removes the battery bridge from this line circuit so that a clear test circuit is extended from the test clerk's desk to the called line conductors.

The test can test the called line over this pair of test conductors, making the various tests usually provided at a test clerk or wire chief's desk in the distant office. After making the test of the called line, an additional digit 1 can be dialed for impulsing the CB relay of the connector to operate counting relay C1 and release counting relay CX, in the previously described manner. This circuit to the connector counter is maintained intact because neither the TT nor the RI relay of the connector is operated. This release of relay CX disconnects (+) potential from conductor 54, thus de-energizing the sleeve conductor of the called line for placing the line relay of this line across the line conductors, so that the test clerk may go across the test conductors with a closed circuit to operate the line relay, which in turn causes the line finder of an idle link to connect to this line circuit and apply dial tone to the connection. In this manner the test clerk may test the functioning of the inward circuits of each line selected. Another digit No. 1 may now be dialed, which is effective to release counting relay C1 and operate counting relay C2 for again applying (+) potential to conductor 54 and thence to the sleeve conductor of the called line for removing the battery bridge from the line circuit to again set up the outward test condition to this line.

From the above description of a test clerk call, it will be obvious that a busy verification call from this same desk or from a special operator's position may be made in a similar manner for connecting to the called line when busy, for the purpose of offering the call to a toll connection or for any other reason desired. When the operator dials the line by way of the combination connector for busy verification purposes, the line number only is dialed, the station digit being omitted, otherwise the dialing of the station digit would remove (+) potential from conductor 54 for releasing the cutoff and lockout relays of the called line which is undesirable in connection with a call of this class.

It will now be assumed that the combination connector (No. 12) is busy when the operator in the distant office dials level 3 from the first selector repeater. When relay CLO1 of the connector marker is operated, a circuit is closed for operating busy relay BY of the incoming selector extending from (+), make contact of relay HC68 of the incoming selector, make contact of relay HC3, conductor 36, make contact of relay CLO1 of the connector marker, conductor 35, break contact of relay GD of the connector allotter, make contact of relay 12AL (operated because the No. 12 connector is busy), conductor 31, make contact of relay CLO1, conductor 41 and winding of relay BY to (−). Relay BY operates and closes a locking circuit for itself extending from (+), uppermost make contact of relay SA, break contact of relay LCO, make contact and winding of relay BY to (−). The operation of relay BY opens up the circuits to the counting relays of the incoming selector for effecting the release of the relay of this group which was left operated. The release of the counting relay opens up the selected channel circuit, thus releasing relays HC68 and HC3, since these relays are not locked in their operated positions because their locking circuits are open at contacts of relay LCO, this relay not being operated on this call because relay UC12 cannot be operated. The reason relay UC12 is not operated is because its winding is open at a make contact of relay 12ALG, not operated at this time because its circuit is open at the lower-most break contact of relay 12AL.

This means that relays CB, SA, SAP and TTC of the No. 12 connector cannot be operated on a call of this class, that is when the No. 12 connector is busy. Relay CLO1 of the connector marker is released when relay BY operates because of the opening of the break contact of the continuity combination of relay BY. Since relay CLO of the connector marker is in series with the CLO1 relay, relay CLO is also released. Busy tone is now applied to the calling line from the source of busy tone, condenser 122, make contact of relay BY of the incoming selector to the tip side of the trunk circuit MT leading to the distant office. Relay BY is maintained locked in its operated position until the connection is released for removing (+) potential from the continuity spring combination of relay BY at the outer-most make contact of relay SA.

*Outgoing trunk call*

On an outgoing call from office A to office B, the line, line marker, finder allotter and finder circuits function in response to the removal of the receiver at the calling station, all in the previously described manner, for connecting the calling line to relay CB of the first selector repeater. The relay operations are now the same, in response to the seizure of the first selector repeater as previously described and the counting relays are operated by impulses transmitted from relay CB. Furthermore, contact 69 of relay CB repeats these impulses over the selected two-way trunk circuit to office B, as previously explained.

In the event that the first digit is anything but 7, the release of relay CHO at the termination of this digit closes a circuit for operating the No. 1 stop relay 1STP extending from (+), lower middle make contact of relay SA, break contact of relay 1STP, break contact of relay CHO, conductor 81 or 82, break contact of relay 2TF, and thence by way of a break contact or a make contact of relay C6, depending on whether the digit operated this latter relay or not, make contact of the counting relay left operated and any of the channel conductors 1 to 3, inclusive, 5, 6 or 8 to 0, inclusive, conductor 123 and upper winding of relay 1STP to (−). Relay 1STP closes a locking circuit for itself at its continuity contact to (+) at the make contact of relay SA. The operation of relay 1STP opens up the "pick up" conductor leading to the counting relays to prevent succeeding impulses from operating the counting relays of the first selector repeater. The succeeding impulses are repeated by contact 69 of relay CB to the selected two-way trunk circuit leading to office B, with the upper winding of relay POL, the winding of coil IMP and the talking condensers all being short-circuited by the make contact of relay CHO, this latter relay being operated since its circuit remains completed to the "pick up" impulse contact of relay CB.

In the event that all trunks to office B are busy when relay 1STP is operated, busy tone will be applied to the calling line by way of its make contact and the make contact of relay BY, since relay BY is operated under this condition by the trunk allotter and trunk marker circuits, in the previously described manner. The UC and the TMC relays are prevented from operating under this condition because no ALG relay of the trunk allotter can be operated when all two-way trunks are busy. Consequently, relay STK of the first selector repeater is not operated, its circuit being open at a make contact of relay TMC. Furthermore, conductor ST leading to the winding of relay SW of the incoming selector associated with this trunk is not energized because it is open at a make contact of relay TMC.

In the event that the first digit is 7 and the second digit is anything except 4, then the circuits function in response to the dialing of No. 7 for the first digit in the previously described manner. Now when relay CHO of the first selector repeater is released at the end of the second digit, a circuit is closed for operating relay 1STP extending from (+), lower middle make contact of relay SA, break contact of relay 1STP, break contact of relay CHO and over the previously described contacts of the 2TF and the counting relays to the multipled channel contacts of the counting relays to the upper winding of relay 1STP for operating this latter relay, which closes the previously described locking circuit for itself. The operation of relay 1STP under this condition again stops the operation of the counting relays but permits the transmission of repeated impulses by contact 69 of relay CB to the distant office. Since relays 1D7 and 2D4 will not be operated under the above condition, the first selector repeater does not function as a selector repeater in response to the third digit, because as previously explained, the "pick up" conductor for operating the counting relays is open.

In the event that all trunks to the main office are busy when the first digit is 7 and the second digit is anything except 4, relay BY is operated over the previously described circuits and the busy tone is connected to the calling line. In this event, no UC relay is operated for extending the connection to an interoffice trunk.

Subject matter disclosed but not claimed herein is claimed in my copending application Serial No. 210,126, filed February 9, 1951, and assigned to the same assignee as the present application.

Having described an automatic telephone system as particularly adaptable for use in an interoffice network, in which one office is a suboffice of the relay type operating out of a distant main office as one specific embodiment of the present invention and since this embodiment discloses certain new and novel features as particularly applied to an all relay type system, it is desired to be understood that the present form is selected to facilitate the disclosure of the invention rather than to limit the number of forms which it may assume and it is to be further understood that various modifications, adaptations and alterations may be applied to the specific form shown in order to meet the requirements of practice without in any manner departing from the spirit or scope of the present invention except as limited by the appended claims.

What I claim is:

1. In an automatic telephone system, a main office and a suboffice interconnected by trunk lines, subscribers' lines in said offices, a plurality of selector repeaters in said suboffice, means controlled in response to calls over said subscribers' lines for selecting one of said selector repeaters and one of said trunk lines, means for transmitting impulse digits from a calling line to said selected selector repeater and for repeating said impulse digits over said selected trunk line, a first and a second digit recording relay associated with each of said selector repeaters responsive only to a particular first digit and a particular second digit transmitted from said calling line, and means controlled by the operation of said digit recording relays for clearing out said selected trunk line and rendering it available to other calls while said selected selector repeater continues to be used by said calling line.

2. In an automatic telephone system, a main office and a suboffice interconnected by trunk lines, subscribers' lines in said offices, a plurality of selector repeaters in said suboffice, means including a plurality of line finder relays operated in various combinations in response to calls over said subscribers' lines for selecting one of said selector repeaters and one of said trunk lines, means for transmitting impulse digits from a calling line to said selected selector repeater and for repeating said impulse digits over said selected trunk line, a first and a second digit recording relay associated with each of said selector repeaters responsive only to a particular first digit and a particular second digit transmitted from said calling line, and means controlled by the operation of said digit recording relays for clearing out said selected trunk line and rendering it available to other calls while said selected selector repeater continues to be used by said calling line.

3. In an automatic telephone system, a main office and a suboffice interconnected by trunk lines, subscribers' lines in said offices selectible by dialing an invariable number of digits, a plurality of selector repeaters in said suboffice, means controlled in response to calls over said subscribers' lines for selecting one of said selector repeaters and one of said trunk lines, means for transmitting impulse digits from a calling line to said selected selector repeater and for repeating said impulse digits over said selected trunk line, a first and a second digit recording relay associated with each of said selector repeaters responsive only to a particular first digit and a particular second digit transmitted from said calling line, and means controlled by the operation of said digit recording relays for clearing out said selected trunk line and rendering it available to other calls while said selected selector repeater continues to be used by said calling line.

4. In a telephone system, two offices interconnected by a trunk line, a selector repeater in one of said offices, a plurality of counting relays associated with said selector repeater, means responsive to the initiation of a call from a dial station on a line in said one office for connecting said line to said selector repeater and for causing said selector repeater to associate itself with said trunk line, means responsive to the dialing of a plurality of impulse digits at said station for selectively operating said counting relays in accordance with the dialed digits and for repeating corresponding impulse digits over said trunk line, and means responsive to the selective operation of said counting relays in accordance with a certain combination of impulse digits for disassociating said selector repeater from said trunk line.

5. In a telephone system, two offices interconconnected by a trunk line, a selector repeater in one of said offices, a plurality of counting relays associated with said selector repeater, means responsive to the initiation of a call from a dial station on a line in said one office for connecting said line to said selector repeater and for causing said selector repeater to associate itself with said trunk line, means responsive to the dialing of a plurality of impulse digits at said station for selectively operating said counting relays in accordance with the dialed digits and for repeating corresponding impulse digits over said trunk line, and means responsive to the selective operation of said counting relays in accordance with a certain combination of impulse digits for disassociating said selector repeater from said trunk line, whereby additional digits selectively operate said counting relays but do not repeat said additional digits over said trunk line.

6. In a telephone system, a selector repeater having access to two groups of outgoing trunks, two groups of trunk selecting relays associated with said selector repeater, means including a calling line for establishing a connection to a called line, means responsive to the seizure of said selector repeater by said calling line during the establishment of said connection for selectively operating the trunk selecting relays of one group for selecting a trunk in one of said trunk groups, and means responsive to dial impulses received over said calling line during the establishment of said connection for selectively operating the trunk selecting relays of the other group for selecting a trunk in the other trunk group and for freeing said trunk in said one trunk group.

7. In a telephone system, a selector repeater having access to two groups of outgoing trunks, two groups of trunk selecting relays associated with said selector repeater, means including a calling line for establishing a connection to a called line, means responsive to the seizure of said selector repeater by said calling line during the establishment of said connection for selectively operating the trunk selecting relays of one group for selecting a trunk in one of said trunk groups, and means responsive to dial impulses received over said calling line during the establishment of said connection for selectively operating the trunk selecting relays of the other group for selecting a trunk in the other trunk group and for releasing the selectively operated trunk selecting relays of said one group, whereby said trunk in said one trunk group is rendered available for another connection while said first mentioned connection remains established.

8. In a telephone system, a selector repeater, two relay type trunk selectors associated with said selector repeater, two trunks each accessible to a separate one of said trunk selectors, means including a calling line for establishing a connection to a called line, means responsive to the seizure of said selector repeater by said calling line for selectively operating the relays of one of said trunk selectors to connect said selector repeater with one of said trunks, means for directively operating the relays of the other of said trunk selectors to connect said selector repeater with the other of said trunks, and means responsive to said last mentioned means for disconnecting said selector repeater from said one trunk.

9. In a telephone system, a selector repeater, two relay type trunk selectors associated with said selector repeater, two trunks each accessible to a separate one of said trunk selectors, means responsive to the seizure of said selector repeater for selectively operating the relays of one of said trunk selectors to connect said repeater with one of said trunks, and means for directively operating the relays of the other of said trunk selectors to connect said selector repeater with the other of said trunks and for causing the relays of said one trunk selector to disconnect said selector repeater from said one trunk.

10. In a digit absorbing selector repeater comprising a plurality of groups of trunk selecting relays, a plurality of outgoing trunks, means responsive to the seizure of said selector repeater for variably operating the trunk selecting relays of one group for seizing a first idle one of said outgoing trunks, impulse receiving means for receiving impulses indicative of any digit value, means for repeating said impulses over said seized trunk, means including said impulse receiving means for variably operating the trunk selecting relays of the other group for seizing a second idle one of said outgoing trunks, and means operated in response to the completion of said reception and repetition of impulses of a predetermined digit value for releasing said first outgoing trunk.

11. In a digit absorbing selector repeater comprising a plurality of groups of trunk selecting relays, a plurality of outgoing trunks, means responsive to the seizure of said selector repeater for variably operating the trunk selecting relays of one group for seizing a first idle one of said outgoing trunks, impulse receiving means for receiving impulses indicative of any digit value, means for repeating said impulses over said seized trunk, means including said impulse receiving means for variably operating the trunk selecting relays of the other group for seizing a second idle one of said outgoing trunks, and means operated in response to the completion of said reception and repetition of impulses of a predetermined digit value for releasing said first outgoing trunk and for causing the trunk selecting relays of said other group to seize said second outgoing trunk.

12. A digit absorbing selector repeater according to claim 11 and including a plurality of counting relays for counting said received impulses.

13. A digit absorbing selector repeater according to claim 11 and including a plurality of counting and recording relays for counting and recording said received impulses.

14. In a telephone system, a selector repeater, two relay type trunk selectors associated with said selector repeater, two trunks each accessible to a separate one of said trunk selectors, means responsive to the seizure of said selector repeater by a calling line for selectively operating the relays of one of said trunk selectors to connect said selector repeater with one of said trunks, and means for directively operating the relays of the other of said trunk selectors to connect said selector repeater with the other of said trunks and to disconnect said selector repeater from said one of said trunks.

15. In a telephone system, a selector repeater, two relay type trunk selectors associated with said selector repeater, two trunks each accessible to a separate one of said trunk selectors, means responsive to the seizure of said selector repeater by a calling line for selectively operating the relays of one of said trunk selectors to connect said selector repeater with one of said trunks, means for directively operating the relays of the other of said trunk selectors to connect said selector repeater with the other of said trunks and to disconnect said selector repeater from said one of said trunks, and means responsive to the seizure of said selector repeater for connecting dial tone to said calling line by way of said one of said trunks or by way of said selector repeater independent of said trunk when said one of said trunks is idle or busy respectively.

WINFRED T. POWELL.

REFERENCES CITED

The following references are of record in the file of this patent:

UNITED STATES PATENTS

| Number | Name | Date |
|---|---|---|
| 1,529,419 | Betulander | Mar. 10, 1925 |
| 1,723,224 | Wicks | Aug. 6, 1929 |
| 1,746,327 | Von Beckerath | Feb. 11, 1930 |
| 1,849,694 | Saunders | Mar. 15, 1932 |
| 1,885,650 | Taylor | Nov. 1, 1932 |
| 1,908,365 | Keyser | May 9, 1933 |
| 2,023,011 | Dunham | Dec. 3, 1935 |
| 2,149,646 | Voss | Mar. 7, 1939 |
| 2,200,817 | Bakker | May 14, 1940 |
| 2,277,586 | Gray | Mar. 24, 1942 |
| 2,409,586 | Powell | Oct. 15, 1946 |